(12) United States Patent
Schaub et al.

(10) Patent No.: US 9,842,347 B2
(45) Date of Patent: Dec. 12, 2017

(54) METHOD AND SYSTEM FOR MANAGING DELIVERY OF LEADS AND BIDDING

(71) Applicant: Dex One Service, Inc., Santa Monica, CA (US)

(72) Inventors: Rene Christian Schaub, Los Angeles, CA (US); Stefano Coccia, Los Angeles, CA (US)

(73) Assignee: Dex Media, Inc., D/FW Airport, TX (US)

( * ) Notice: Subject to any disclaimer, the term of this patent is extended or adjusted under 35 U.S.C. 154(b) by 770 days.

(21) Appl. No.: 13/706,969

(22) Filed: Dec. 6, 2012

(65) Prior Publication Data

US 2013/0097013 A1 Apr. 18, 2013

Related U.S. Application Data

(63) Continuation-in-part of application No. 12/477,656, filed on Jun. 3, 2009, now abandoned.

(60) Provisional application No. 61/598,784, filed on Feb. 14, 2012.

(51) Int. Cl.
*G06Q 30/00* (2012.01)
*G06F 15/16* (2006.01)
*G06Q 30/02* (2012.01)
*G06Q 30/08* (2012.01)

(52) U.S. Cl.
CPC ......... *G06Q 30/0246* (2013.01); *G06Q 30/02* (2013.01); *G06Q 30/0241* (2013.01); *G06Q 30/0249* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 8,719,082 B1 * | 5/2014 | Snyder | G06Q 30/0275 705/14.1 |
| 8,725,572 B1 * | 5/2014 | Niles et al. | 705/14.69 |
| 2005/0038894 A1 * | 2/2005 | Hsu | G06Q 30/02 709/228 |
| 2006/0074749 A1 | 4/2006 | Kline et al. | |
| 2006/0224496 A1 * | 10/2006 | Sandholm et al. | 705/37 |
| 2007/0027761 A1 | 2/2007 | Collins et al. | |
| 2009/0132340 A1 * | 5/2009 | Demir | G06Q 30/02 705/7.29 |
| 2010/0153391 A1 * | 6/2010 | Reese | 707/736 |
| 2014/0304088 A1 * | 10/2014 | Snyder et al. | 705/14.71 |

* cited by examiner

*Primary Examiner* — Arthur Duran
*Assistant Examiner* — Michael J Sittner
(74) *Attorney, Agent, or Firm* — Mark E. Stallion; Greensfelder, Hemker & Gale, P.C.

(57) ABSTRACT

A system and method that enables a business owner to receive leads such as phone calls or emails to their business at a prescribed cost-per-lead and a volume determined by the budget the owner is willing to allocate to the purchase. The method manages an internet based advertisement campaign, which includes performing the step of creating an internet based advertisement campaign that includes a budget parameter, a campaign duration parameter, advertisement content with a lead reference, and an ad listing with a URL that links to said advertisement content. Another embodiment of the method can include managing the bidding process for a multi-item keyword auction.

18 Claims, 17 Drawing Sheets

METHOD AND SYSTEM FOR MANAGING DELIVERY OF LEADS AND BIDDING

CROSS REFERENCE

This application is a continuation-in-part of U.S. Non-Provisional patent application Ser. No. 12/477,656 filed Jun. 3, 2009 and titled METHOD AND SYSTEM FOR MANAGING DELIVERY OF LEADS TO A BUSINESS and further claims priority to and the benefit of U.S. Provisional Patent Application Ser. No. 61/598,784 filed Feb. 14, 2012 and titled METHOD AND SYSTEM FOR MANAGING DELIVERY OF LEADS AND BIDDING, both of which are incorporated herein by reference in their entirety.

BACKGROUND

Field of Art

This invention relates generally to managing pay-per-click internet based marketing campaigns and, more particularly, to performance base advertisement for maximizing delivery of leads to a business and return on investment for such campaigns.

Background Art

Pay-per-click (PPC) advertising revolutionized direct marketing to consumers on the internet. GoTo was one of the first to introduce the concept of PPC advertising. Today PPC is fundamental to the monetization of search-engine results and fundamental to driving qualified traffic to websites. E-commerce sites and large brand sites were the first to adopt PPC as a marketing strategy while small and medium sized businesses have been slow to move in that direction. A small business values direct customer interaction through a phone call or email, and regards a click to a website as only the first step in the sale conversion funnel. Measuring the conversion from clicks to calls as well as understanding the conversion of calls to customers realized is necessary to properly manage the PPC campaign and ensure positive return-on-advertiser-spend (ROAS). This places the burden on the small business owner to collect data and run complex analytical calculations on a regular basis. If the calculations are flawed because of lack of data or scarcity of quality data, the business owner may overspend for traffic that does not deliver ROAS or underspend and not receive any traffic.

The primary challenge with PPC for a small business is that the business owner is interested in leads, such as phone calls, emails, filled out lead forms requesting services, and less interested in website clicks. The pay-per-click model has been modified to other models, for example, the pay-per-call (PPCall) model by Ingenio where a business sets up a campaign similar to a PPC campaign but is bidding for calls not clicks. While these models may be more attractive to the small business owner, these models do not solve their problem of providing visibility into the call volume (or lead volume) that will be delivered and the effective cost-per-lead incurred. In addition, leads are delivered in unpredictable bursts that can overwhelm a small business owner's ability to process them and results in waste.

From the perspective of a small business owner what is needed is a method and a system that provides predictable lead volume and price transparency of the effective cost-per-lead. What is further needed is a method and system that delivers the leads consistently throughout the duration of the campaign.

Another concern of business owners is managing the bidding or auction process for on-line keyword search engines. Businesses often will bid on keywords for search engine providers such that their advertisement or website is at the top of the list of search results when a user enters a search query using certain keywords. The problem, is managing the bidding process to be cost effective and achieve the greatest result. To address this concern businesses often hire marketing consulting firms to manage the bidding process. The consulting firms manage the pay-per-click ad campaigns and the bidding process in order to achieve the businesses' click-through realization goals. The consulting firms often use rule based algorithms to establish and maintain keyword bidding. However, managing the bidding process has its difficulties, particularly if the consulting firm is managing multiple businesses that are very similar.

BRIEF SUMMARY OF INVENTION

The invention enables a business owner to receive leads such as phone calls or emails to their business at a prescribed cost-per-lead and a volume determined by the budget the owner is willing to allocate to the purchase. The method and system of the present invention provides the ability to provide price transparency in the cost-per-lead (e.g., cost-per-call) that can be expected based on business type and location and specify a budget, for example a monthly budget, that the business is willing to spend. Based on these two inputs the business can expect to receive on-average as many leads as the business's budget divided by the cost-per-lead, if the business has performance characteristics comparable to an average peer business.

One embodiment of the present invention is a method for managing an internet based advertisement campaign, which includes performing the step of creating an internet based advertisement campaign that includes a budget parameter, a campaign duration parameter, advertisement content with a lead reference, and an ad listing with a URL that links to said advertisement content. The ad-listings can be syndicated to a plurality of internet sites. The method can include the step of monitoring the leads received by the advertiser from each lead reference and decrementing the campaign budget for each click on the ad listing URL by the product of the cost-per-lead and the median peer advertisements' conversion rate of clicks to leads, and a multiplier unique to each advertiser, in the case of purchased search engine clicks. The method can further include the step of purchasing traffic from search engines to the advertisement to generate leads and spend any remaining budget.

Optionally the ad listing can also contain a lead reference, distinct from the lead reference of the advertisement and the method can further comprise the steps of monitoring of the leads received by the advertiser from the ad-listing lead reference and decrementing the campaign budget by a cost-per-lead amount for each lead received from the ad-listing lead reference, wherein a lead reference is a phone number or email address. Leads can comprise any of phone calls, text messages, emails, digital lead forms, or facsimile lead forms. If multiple ad listings are displayed the computer implemented method can further order the ad listings based on their performance, consumed budget, remaining budget, and remaining campaign duration. The computer implemented method can further report on the number of leads delivered and budget consumed.

Another embodiment of the technology manages the bidding process in a multi item auction, including managing multiple advertisers. In a multi item auction, the bidder is bidding for one item in a list of items, in order of decreasing value. There can be multiple positions on the list of items being bid upon $1^{st}$, $3^{rd}$ and etc. . . . and the highest bid gets the 1st item on the list and the second highest bid gets the second item and so forth. The highest value item is auctioned to the highest bidder, the second highest value item to the second highest bidder, and so on. Variations include: multiplying bids by performance factors, generalized second price auctions, Vickrey auctions and auctions based on proxy bidding. A consulting agency may be bidding on behalf of many clients at the same time, and multiple clients may successfully obtain one item each from the list. The invention is applicable in the context of interne pay-per-click auctions (or pay-per-impression or pay-per-call), or any other multi item auction. The method of determining bids claimed in the invention does not raise bids in response to a client peer's bid, resulting in more item placements and thereby delivering more value to clients than if bids were determined independently for each client. A peer here can be a client that is managed by the same agency as another client. The bids may be raised with respect to another client's bid.

These and other advantageous features of the present invention will be in part apparent and in part pointed out herein below.

BRIEF DESCRIPTION OF THE DRAWINGS

For a better understanding of the present invention, reference may be made to the accompanying drawings.

Figure 1:
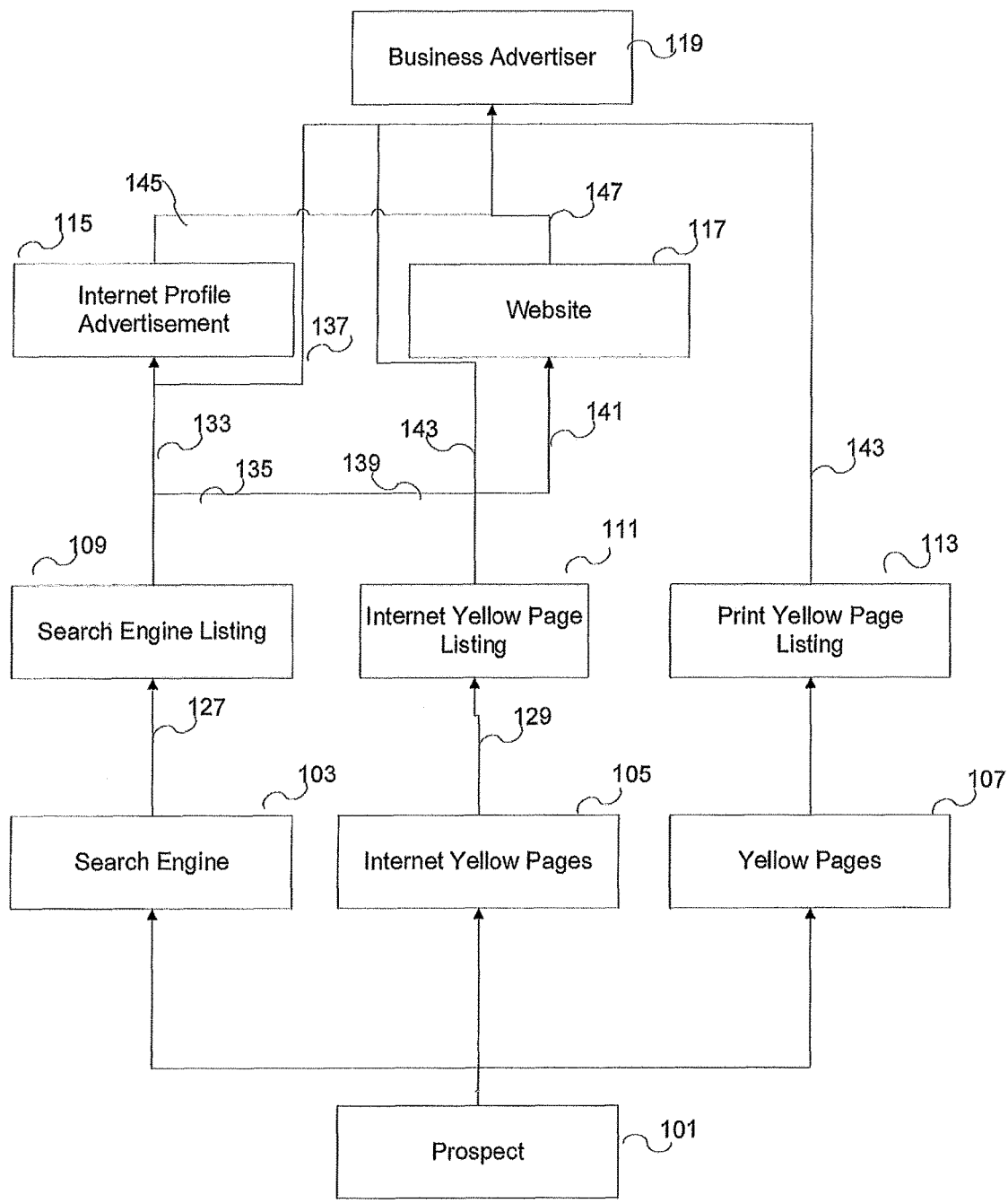
FIG. 1 illustrates an embodiment of the lead-delivery system configured in accordance with the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-9 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

The following detailed description of the invention contains many specifics for the purpose of illustration. Anyone of ordinary skill in the art will appreciate that many variations and alterations to the following details are within scope of the invention. Accordingly, the following embodiments of the invention are set forth without any loss of generality to, and without imposing limitations upon, the claimed invention.

One embodiment of the present invention comprises a system and method that enables a business owner to receive leads such as phone calls or emails to their business at a prescribed cost-per-lead and a volume determined by the budget the owner is willing to allocate to the purchase, which teaches a novel system and method for managing an internet based advertisement campaign, which includes performing the step of creating an interne based advertisement campaign by entering data into a computer that includes a campaign targeting information parameter, a campaign distribution information parameter, a campaign budget information parameter, a campaign duration parameter, an advertisement with a lead reference, and an ad listing with a URL that links to said advertisement content. The method can include the step of formulating a cost-per-lead parameter based on geographic, category and attribute targeting selected from geographic, category and attribute taxonomies. The ad listing can be syndicated to a plurality of internet sites. The method can include the step of monitoring the leads received by the advertiser from each lead reference and decrementing the campaign budget for each click on the ad listing URL by the product of the cost-per-lead and the advertisement's conversion rate of clicks to leads. The method can farther include the step of purchasing traffic from search engines to the advertisement to generate leads and spend any remaining budget.

Another embodiment of the invention can be a computer system including a processor, a memory unit operable for storing a computer program, an input mechanism operable for inputting data into said computer system, an output mechanism for presenting information to a user, a bus coupling the processor to the memory unit, input mechanism and output mechanism, wherein the computer system includes various executable program modules stored thereon where when executed are operable to perform functions. The computer system can comprise campaign creation program module stored on said computer system where when executed allows a user to create an advertising campaign by entering data into the computer system where said data includes campaign details for a campaign targeting information parameter, a campaign distribution information parameter, a campaign budget information parameter, a campaign duration parameter, an advertisement with a lead reference, and an ad listing with a URL that links to said advertisement.

An optimization module can also be stored on said computer system where when executed formulates a cost-per-lead parameter based on geographic, category, lead type, originating source and attribute targeting selected from geographic, category and attribute taxonomies. An internet distribution program module can be stored on said computer system where when executed allows the user to syndicate the ad listing to a plurality of internet sites. The user can select the partner properties or internet sites for syndicating using this program function. A reporting program module can allow the user to monitor the leads received by the advertiser from each lead reference after the campaign has been set up. An optimization program module stored on said computer system where when executed can decrement the campaign budget for each click on the ad listing URL by the product of the cost-per-lead and the advertisement's conversion rate of clicks to leads. A purchased traffic prop-am module stored on said computer system where when executed can allow the user to purchase traffic from search engines to the advertisement to generate leads and spend any remaining budget.

The ad listing can contain an ad lead reference, distinct from the lead reference of the advertisement. A reporting program module can be stored on said computer system where when executed allows the user to monitor the leads received by the advertiser from the ad-listing lead reference. Further, an optimization program module can be stored on said computer system where when executed decrements the campaign budget by a cost-per-lead amount for each lead received from the ad-listing lead reference. The lead reference can be a phone number or email address. The leads can be selected from a group consisting of phone calls, text messages, emails, digital lead forms, and facsimile lead forms, wherein if multiple ad listings are displayed by the reporting program module the purchased traffic module is further operable to order the ad listings based on their performance, consumed budget, remaining budget, and remaining campaign duration. The reporting program module can be further operable to report on the number of leads delivered and budget consumed.

The advertising campaign data entered can include campaign details for a business name parameter, a business location parameter, a tag line, and a brief description of the business including any key areas of specialization. The campaign data entered can be used for constructing the ad listing that is displayed on the internet site and used for constructing a business profile. The campaign can include reporting estimates of the number of leads to expect from. The campaign can further comprise geography, category and attribute mapped to a target found to generate traffic where said target is purchasable for a search marketing source, where said purchasable target is key worded with a set of key phrases that are descriptive of the target's geography, category and attribute such that when a user selects a geography, category and attribute during campaign creation, the ad for the target inherits the purchasable targets and key phrases.

In a multi item auction environment, the bidder can bid for one item in a list of items, in order of decreasing value. The highest value item can be auctioned to the highest bidder, the second highest value item to the second highest bidder, and so on. Variations include: multiplying bids by performance factors, generalized second price auctions, Vickrey auctions and auctions based on proxy bidding. A consulting agency may be bidding on behalf of many clients at the same time, and multiple clients may successfully obtain one item each from the list. This implementation of the invention is applicable in the context of internet pay-per-click auctions (or pay-per-impression or pay-per-call), or any other multi item auction. The method of determining bids claimed in the invention does not raise bids in response to a client peer's bid, resulting in more item placements and thereby delivering more value to clients than if bids were determined independently for each client.

One implementation of the technology is a method to bid on behalf of clients on pay-per-click or impression or call auctions, such that bids are only dependent on competing auction participants that are not under the agency's management. This is a difficult problem to solve, because the auction placements are dependent on the individual client bids in a highly non-linear and dynamic manner, performance metrics are non-linear and uncertain, the amount of keywords to bid on is large, and the bids have to be revised frequently. The method splits the problem into an advertiser independent portion, and an advertiser specific portion. The advertiser independent portion determines base bids on set of keywords to achieve a desired sum of clicks (or calls or impressions) at minimal cost, or alternatively, maximizes the number of clicks (or calls or impressions) for a given budget. The advertiser specific portion modulates all keyword bids of each advertiser in a manner that each advertiser receives traffic in proportion to their budget needs. An implementation of the advertiser specific portion includes, but is not limited to, a daily directional update of the modulating factor until an advertiser's target traffic quota is met. An implementation of the advertiser independent portion includes, but is not limited to, a keyword portfolio optimization model using historical data summarized over advertisers, and solved using a Lagrangian dual formulation and line search. Both portions are run periodically and resultant bids for all clients are committed to the auction The details of the invention and various embodiments can be better understood by referring to the figures of the drawing. Referring to FIG. 1, which illustrates an embodiment of the lead delivery system configured in accordance with the present invention, and which is not intended to limit scope as one of ordinary skill would understand on review of this application that other configurations could be utilized without departing from the scope of the claimed invention. A prospect 101 may represent an internet user or an off-line prospect with access to print advertising such as the yellow pages. The prospect is exposed to the business owner's advertisement (or listing) through multiple venues which include the use of a search engine 103, the use of an internet yellow pages site 105, or use of print yellow pages 107. When the prospect is exposed to the business owner's search engine listing 109 through an internet connection 127, that prospect may be given the options to (i) click-to-a-profile advertisement 133 which takes the prospect to the business owner's internet profile advertisement 115 containing further information about the business and contact information, (ii) click-to-a-website 135 which takes the prospect to the business owner's website 117 containing further information about the business and contact information, and/or (iii) establish direct communication 137 with the business owner 119 through a phone call using the number listed in the search engine listing 109.

When the prospect is exposed to the business owner's internet yellow page listing 111 through an internet connection 129, that prospect may be given the options to (i) click-to-a-profile advertisement 139 which takes the prospect to the business owner's internet profile advertisement 115 containing further information about the business and contact information, (ii) click-to-a-website 141 which takes the prospect to the business owner's website 117 containing further information about the business and contact information, and (iii) establish direct communication 143 with the business owner 119 through a phone call, email address, or text message using the number or email listed in the listing 111.

When the prospect is exposed to the business owner's print yellow page listing 113, that prospect may be given the options to establish a direct communication 143 with the business owner 119 through a phone call using the number listed in the yellow page listing 113. The prospect may also be provided with the URL of the business owner's website whereby the user can enter the URL into a browser application of a personal computing device having access to the internet. When the prospect is exposed to the business owner's profile from either a search engine listing or a yellow page listing, the prospect is given the option to establish direct communication 145 with the business owner 119 through a phone call, email address, or text message using the number or email listed in the profile 115. When the prospect is exposed to the business owner's website from either a search engine listing or a yellow page listing, the prospect is given the option to establish direct communication 147 with the business owner 119 through a phone call, email address, or text message using the number or email listed in the profile 117.

Figure 2:
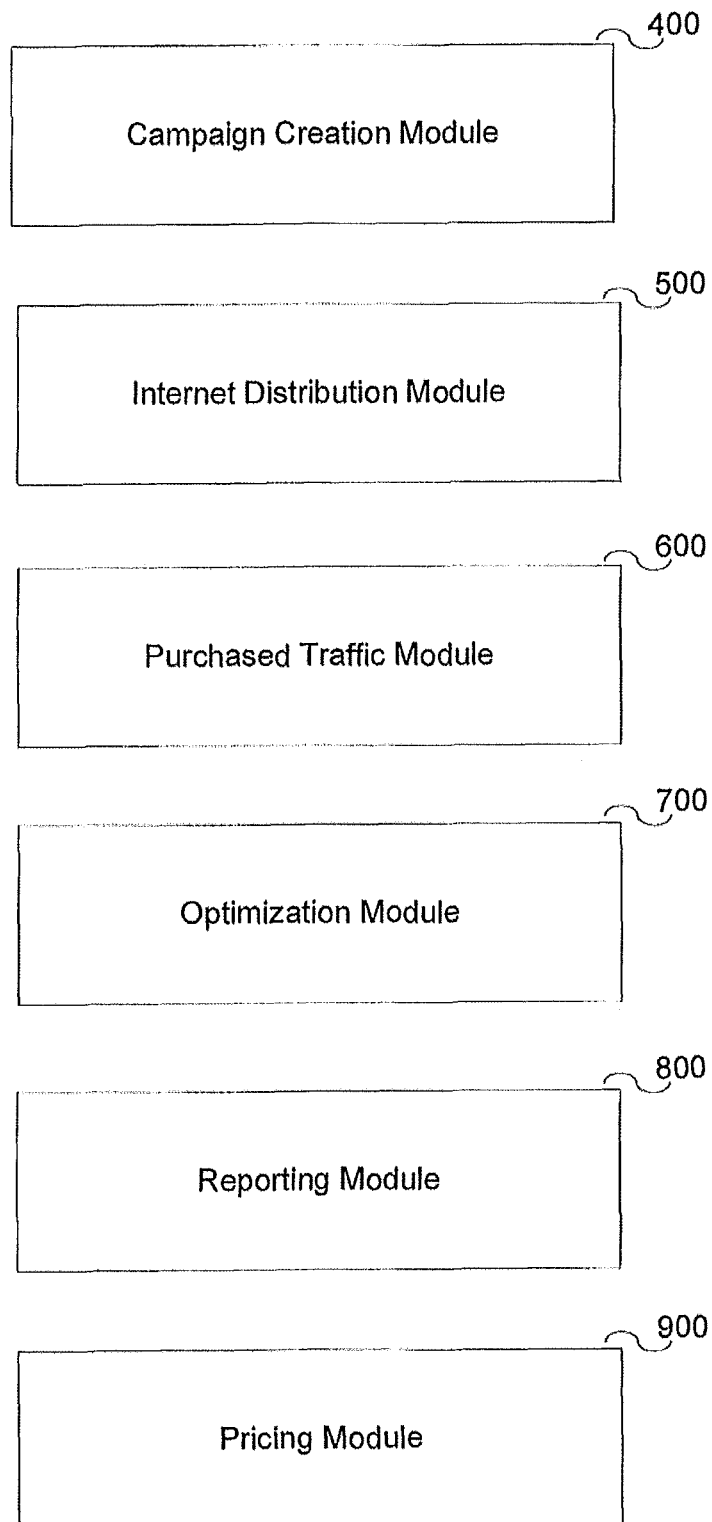
FIG. 2 is a functional description of the system in accordance with one embodiment of the present invention.
Figure 3:
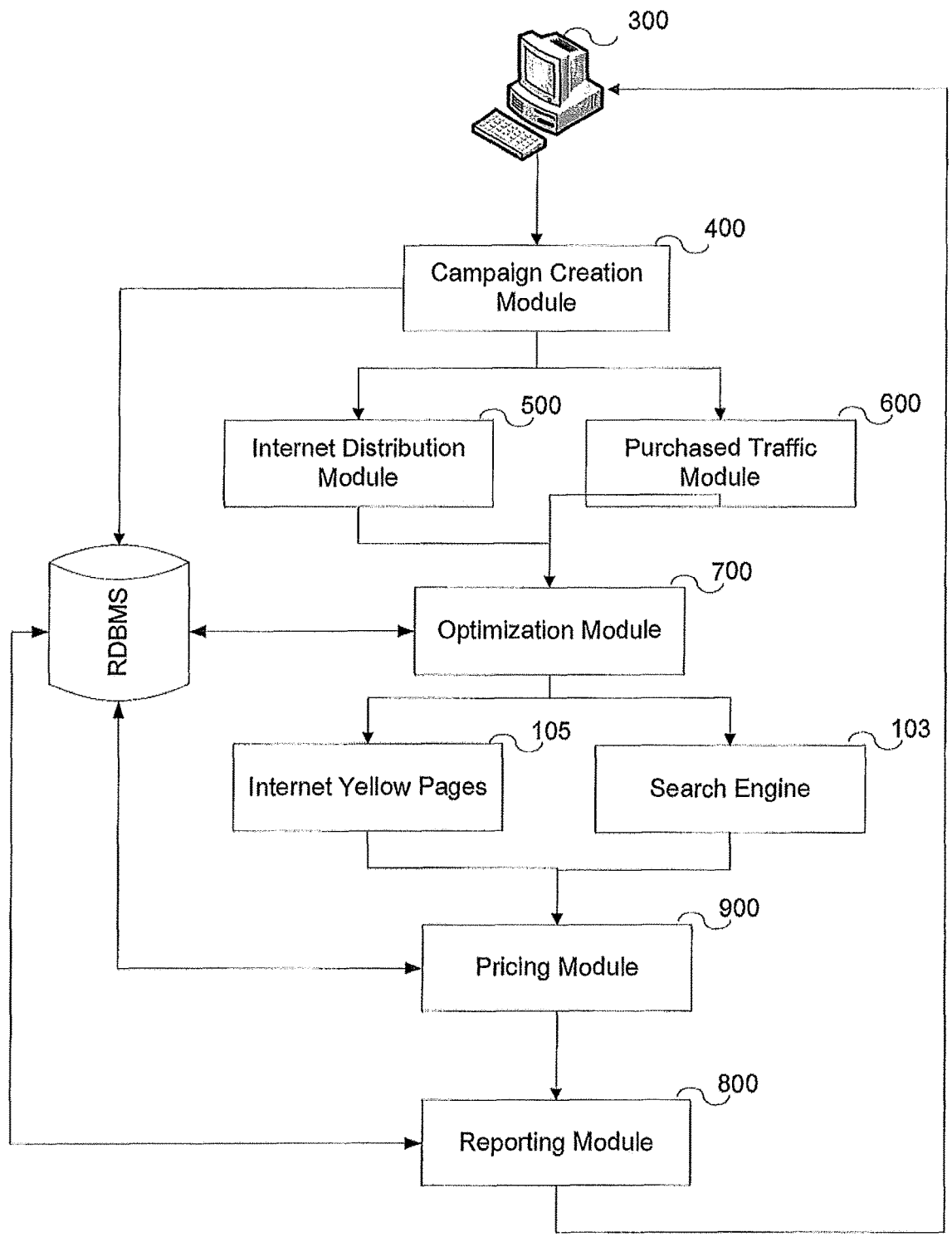
FIG. 3 illustrates an exemplary computing environment of the lead-delivery system configured in accordance with one embodiment of the present invention.

FIG. 2 illustrates an embodiment of the functional description of the system configured in accordance with the present invention and is not intended to limit scope as one of ordinary skill would understand on review of this application that other configurations could be utilized without departing from scope of the claimed invention. Referring to FIG. 3, a user interacts with the campaign creation module 400 to create an advertising campaign in the system for delivery of leads to the user's business. The internet distribution module 500, the purchased traffic module 600, and the optimization module 700 are responsible for executing the campaigns created in module 400. The user can track the performance of the campaign in the reporting module 800 that displays leads delivered to the business compared to the estimated lead number and the budget consumed. The pricing module 900 computes the fair-market value of the any non-lead actions generated by modules 500 or 600 using as input an established cost-per-lead (CPL). Both the CPL and the pricing from the pricing module are used by the optimization module and also used to decrement the advertisers budgets for leads or actions generated by their campaign.

The CPL values depend on the specific geo-vertical and the lead type, and the computation uses multiple data sources to triangulate to a geo-vertical CPL. The data sources for triangulating include (i) search engine cost-per-click data, (ii) internet yellow pages cost and conversion data, and (iii) market research on competitive CPLs. Each data source generates an initial value for the CPL. For example, triangulating to compute the cost-per-call using the search engine's cost-per-click data for the vertical "attorneys" and geography "Chicago", the system would sum the total cost to purchase traffic on the search engine to "Chicago-attorney" business profiles and then divide that cost by the total number of calls that were generated. Note that other lead types, such as filling out a lead-form yield a different CPL value because the conversation rate differs. Similarly other traffic sources yield different values because both the cost to purchase traffic and the lead conversion rate for that traffic differ. To combine the various data sources into a single CPL for a specific lead type, each data source is weighted by the relative volume of leads delivered by each source. This weighting approach is similar to the weighting of Paashe or Laspeyres consumer price, indices by the market share of the goods. As proxy to these weights the systems uses the relative volume of traffic an individual source represents among all of the data sources. This proxy is valid under the assumption that higher traffic correlates with higher lead delivery volume to business owners.

FIG. 3 illustrates an embodiment of the computing environment of the system configured in accordance with the present invention and is not intended to limit scope as one of ordinary skill would understand on review of this application that other configurations could be utilized without departing from scope of the claimed invention. Referring to FIG. 3, a business owner interacts with the campaign creation module 400 through a computer terminal 300 to create the advertising campaign. The details of the campaign creation are persisted in the relational database management system 302 and communicated to internet distribution module 500 and purchased traffic module 600. These two modules communicate with the optimization module 700 to syndicate the ad listing to interne yellow pages 105 and search engine 103, respectively. User activity such as clicks, calls, emails, or send-to-phone are tracked and priced by the pricing module 900 to properly decrement the business owner's budget and compensate the syndication partner. This activity is persisted in the relational database management system 302, and then communicated to reporting module 800 together with the ad-listing views and the details of those views such as property, listing rank, and taxonomy node or search query. The reporting module persists all this information and prepares the report that is made available to the business owner through computer terminal 200.

Figure 4:
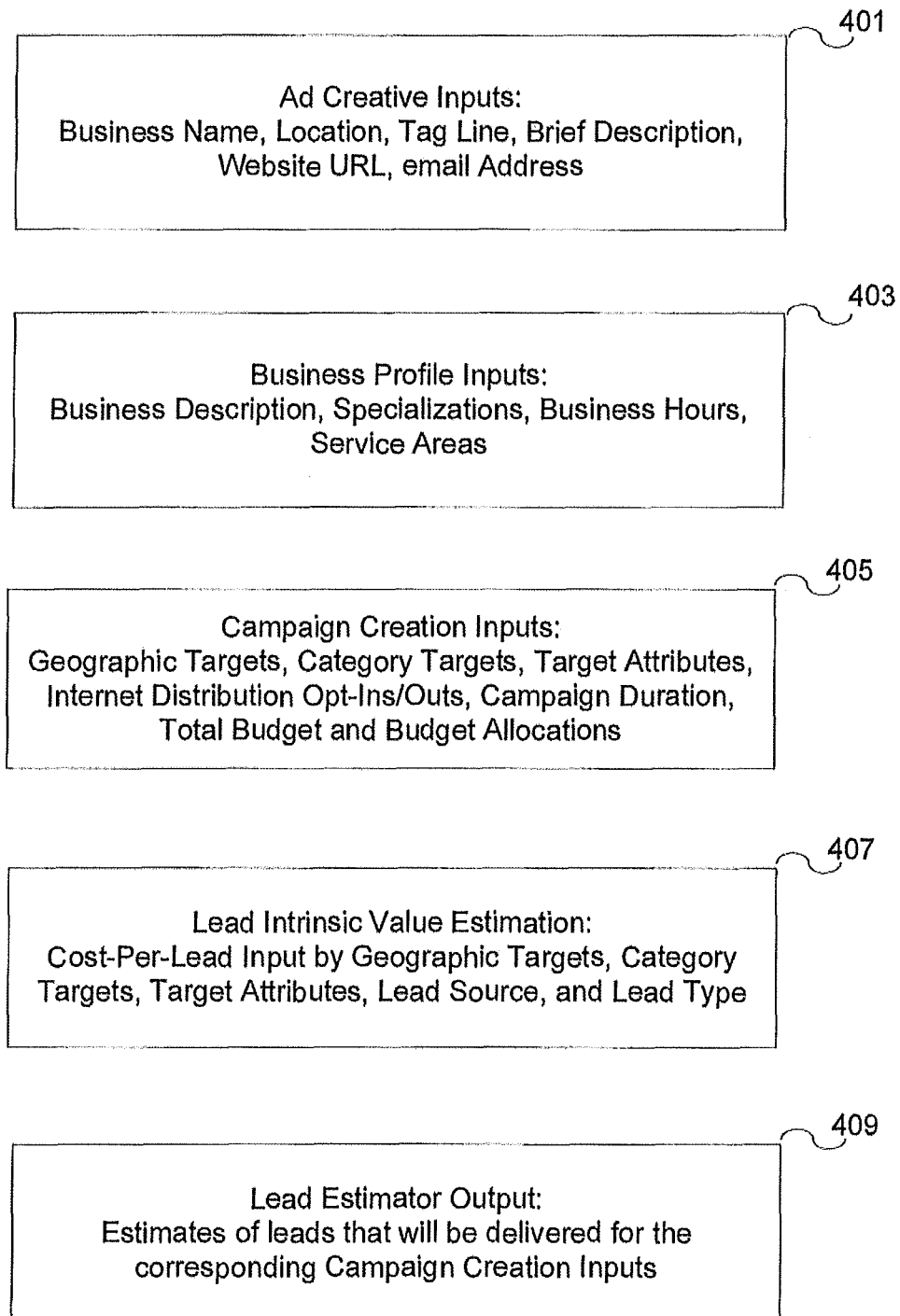
FIG. 4 is the campaign creation module in accordance with one embodiment of the present invention.

FIG. 4 illustrates an embodiment of the campaign creation module configured in accordance with the present invention and is not intended to limit scope as one of ordinary skill would understand on review of this application that other configurations could be utilized without departing from the scope of the claimed invention. Referring to FIG. 4, a user enters the details of the advertising (ad) creative in 401. By way of example, these details might include the business name, business location, a tag line for the business, and a brief description of the business including any key areas of specialization. These inputs are used to construct the ad creative (or ad listing) that is displayed on partner internet properties by the interne distribution module 500 illustrated in FIG. 3. If the business has a website and email contact information, the user can also enter the website URL and email address in 401. Tracking-phone numbers, which are numbers that a third party can track calls made to those numbers, is assigned to the ad listing by the system. The number of tracking-phone numbers assigned depends on the number of interne properties used to display the listing.

In 403, the business user enters more detailed business information that is used to construct the business profile. The business profile is a set of one or more tabbed html pages that are displayed when an internet user clicks on ad listing title to read more information about the business. The additional information may include a full business description, all areas of specialization, business hours, business reviews, and service areas for service'businesses. If a website URL or email address was entered in 401 it will also appear in the business profile. Tracking numbers distinct from those assigned to the ad listing are assigned to the business profile to enable tracking of calls generated from the business profile.

In 405, the business user enters details needed to construct the advertising campaign. The details entered can include campaign targeting information, campaign distribution information, campaign budget information, and campaign duration information. The targeting information includes geographic targeting, category targeting, and attribute targeting selected from geographic, category, and attribute taxonomies. The geographic targeting can be very broad such as nation-wide, or very specific such as a zip-code or neighborhood. Multiple geographic targets can be selected in one campaign. Similarly, the multiple category and attribute targets can be selected in one campaign. For example, a surgeon may select cardiac surgery, thoracic surgery, and vascular surgery as target categories and under cardiac surgery may select attributes heart transplantation. The internet distribution selection enables the business user to opt-out of certain internet properties from the set of network properties which the present invention uses to display ads. For example, the surgeon may not want her ads shown on a property catering to cosmetic surgeons. The user also enters the campaign duration and total campaign budget, and if desired, the percent allocation of the budget to each campaign target can also be set. The user can enter multiple campaigns for example if the campaigns are designed to run over a year duration but with monthly budgets.

The present invention gets as input the Cost-Per-Lead (CPL) in 407. A lead is a direct contact between an internet user and the business user through one of the touch points displayed in the ad listing, the business profile, or the website. These include, for example, an email, a call, a text message, a lead form with a return email address or phone number. The CPL varies with the geographic, category, and attribute targeting because business users are willing to pay more for certain leads that generate a higher revenue return. For example, a law firm will pay more for personal injury leads than for intellectual property leads. The CPL can also vary by the lead type. For example, a mortgage broker will pay more for a completed mortgage lead form than for an email requesting information. Lastly, the CPL can also vary by the originating source such as ad listing, business profile, or website. A lead from a website might be considered a more qualified lead because the internet user has consumed more knowledge regarding the business before contacting it. Once the user has completed the campaign creation, in 409 the user can view estimates of the number of leads to expect from that campaign.

Figure 5:
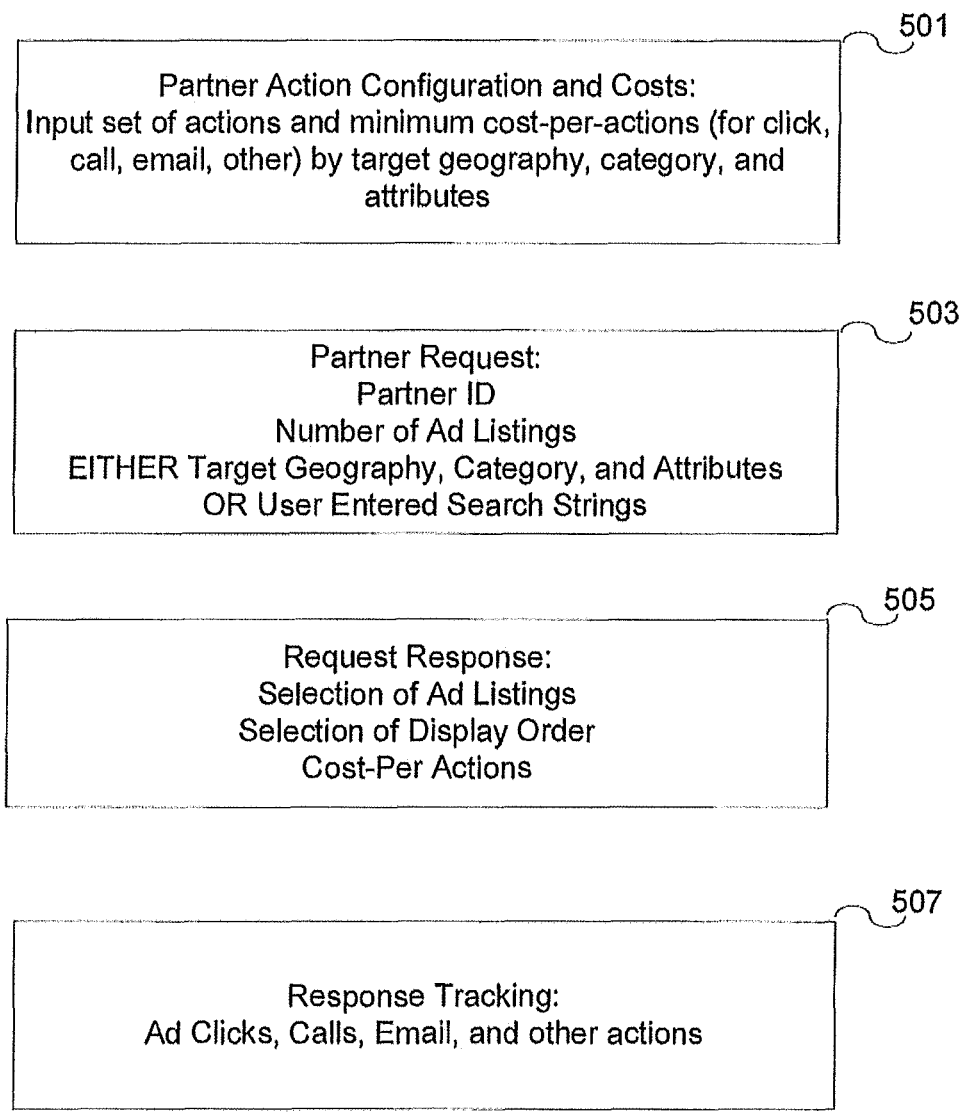
FIG. 5 is the internet distribution module in accordance with one embodiment of the present invention.

FIG. 5 illustrates an embodiment of the internet distribution module configured in accordance with the present invention and is not intended to limit scope as one of ordinary skill would understand on review of this application that other configurations could be utilized without departing from the scope of the claimed invention. Referring to FIG. 5, in 501 the present invention gets as input the set of actions in the ad listings that are displayed by partner property and the minimum costs for those actions that are specific to the geography, category and attribute taxonomy. A partner, for example, may not want to display ad listings with tracking numbers and that action would be removed from the ad listings displayed on that property. The remaining actions would have costs determined in accordance with the partner and those costs would be inputs to the present invention.

The interaction between the partner property and the present invention involves a partner request initiated by a page view on the partner site 503, a response to that request from the host system of the partner internet site is generated by the present invention 505, and tracking of the internet user's actions on receipt of the response 507. In message 503, the page view that initiates the request must pass to the present invention (i) a partner id that identifies the partner source, (ii) EITHER the taxonomy geography, category and attributes of the page view OR one or more search strings entered by the internet user that the present invention can map to a taxonomy geography, category and attributes, and (iii) the number of ad listings requested.

When the present invention receives message 503, it responds with message 505 that contains ad listings not exceeding the number requested and each ad listing configured in accordance with the partner requirements. Message 505 also contains the ad listing display order that defines the order in which the ad listings are arranged on the partner page. Lastly message 505 contains the cost-per-action that complies with the minimum CPAs set in 501. Note that the determination of the ad listings to show, the display order, and the cost-per-actions is computed by the optimization module 700 in reference to FIG. 3.

Once the page is rendered for the internet user, that user interacts with the ad listings through navigational clicks, calls, or other available actions. Each of those actions is captured in message 507 sent back to the present invention. The actions are used for accounting purposes to determine payment to the partner and, in reference to FIG. 3, to optimize future response messages in 800 and to decrement the advertisers' budget in 900.

Figure 6:
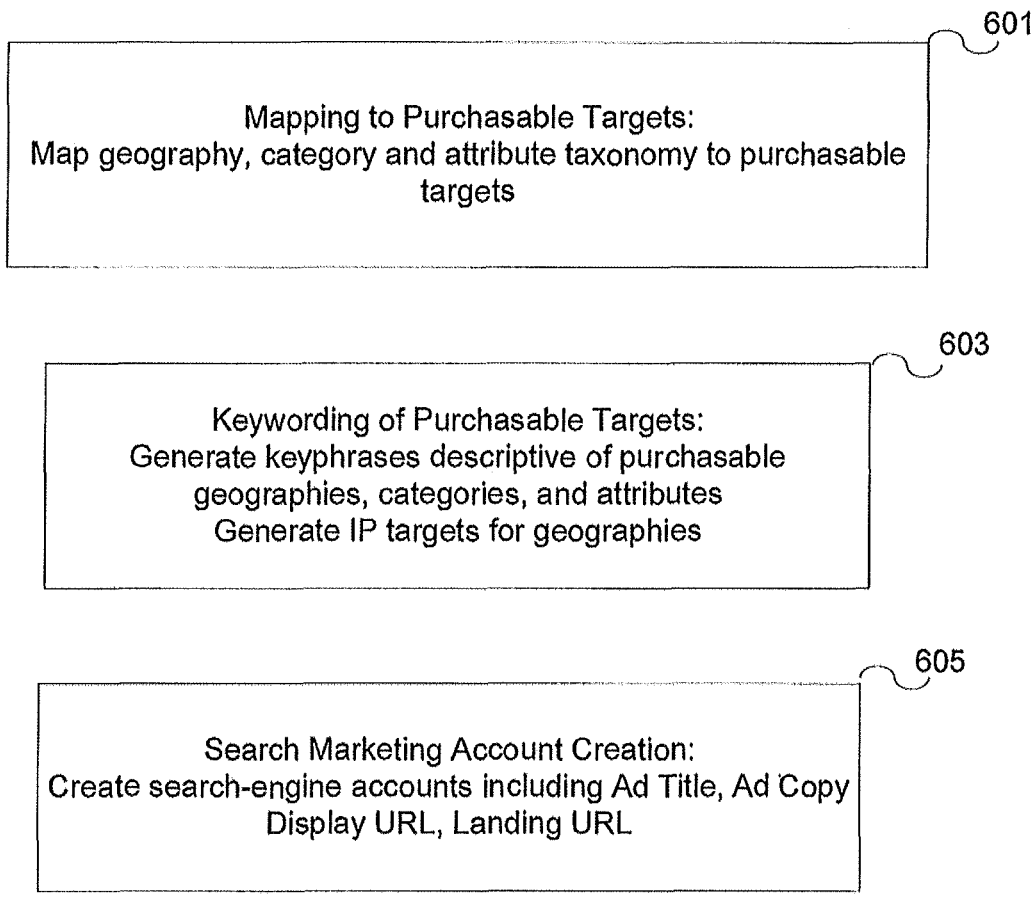
FIG. 6 is the purchased traffic module in accordance with one embodiment of the present invention.

FIG. 6 illustrates an embodiment of the purchased traffic module configure in accordance with the present invention and is not intended to limit scope as one of ordinary skill would understand on review of this application that other configurations could be utilized without departing from the scope of the claimed invention. The present invention purchases traffic to ad listings and/or business profiles when insufficient traffic is received from the sum-total of all other sources to consume the budgets or when the optimization module determines that it is optimally beneficial to purchase more traffic to a particular business.

Referring to FIG. 6, in 601 the taxonomy geographies, categories, and attributes are mapped to targets that are purchasable for each search marketing source. Not all taxonomy combinations of geography, category, and attributes generates meaningful traffic and these must be mapped to those that do generate traffic. That mapping is dependent on the search marketing source.

In 603, each purchasable target must be key worded with a set of key phrases that are descriptive of the target's geography, category, and attributes. When a business user selects a geography, category and attribute target during campaign creation, the ad for that target inherits the purchasable target(s) and the key phrases defined in 601 and 603. In addition to geographic targeted key phrases, the interne user's IP can be used to target geographies in 603.

In 605 search marketing accounts are created for the purchasable targets by programmatically or manually entering ad title, ad copy, display URL and landing URL that conform to the search marketer's specifications. For a specific purchasable target, separate accounts can be created for each business in which case the landing URL corresponds to the URL of the business profile for each business. Alternatively, only a single account is created for that purchasable target and the landing URL points to a generic profile that is instantiated by the present invention to a different business profile depending on the optimization needs determined by the optimization module.

FIG. 7(*a*)-(*b*) illustrate an embodiment of the optimization module configured in accordance with the present invention and is not intended to limit scope as one of ordinary skill would understand on review of this application that other configurations could be utilized without departing from the scope of the claimed invention, Referring to FIG. 7(*a*), 701 selects the set of ad listings, the display order, and the cost-per-actions used to compose a response message 505 in reference to FIG. 5. The computation of which ad listings to display, their display order and their cost-per-action is designed to consume the budget smoothly and maximize the profit over the campaign duration. This computation uses as inputs the total budget and the available budgets for all ad listings that are eligible for the request message 503, the ad listings historical conversion to clicks or leads by action type and display rank, the conversion to leads on the business profile or website from ad-listing clicks redirecting to the business profile or website, and the remaining campaign duration.

The optimization module also includes the computation of bids for each key phrase defined in 603. The bids depend on the volume of traffic requested by the present invention to supplement a traffic shortfall from the other sources. In addition, the bids depend on the historical performance of the ad by key phrase. Using the historical data available that includes the search marketing ad display position, clicks generated, cost-per-click (as distinct from bid submitted), and leads generated from the business profile receiving the traffic, together with the traffic volume requested, 705 computes bids for the key phrases for that account that delivers the requested volume. By way of example, consider an account containing a portfolio of two keywords "lawyers" and "attorneys". The computation of the bids begins by computing the cost-volume elasticity curve for each keyword. In practice, these curves are convex with increasing slope as the volume increases, significant of the increasing incremental cost to acquire traffic at higher baseline volumes. The slope of the elasticity curve at a given volume is the marginal cost to acquire additional traffic for that keyword. The bid computation first solves for the volumes V(k) for each keyword k where all the marginal costs are equal and where the sum of these volumes equals the volume requested. The bid computation then solves for the bids necessary to deliver the keyword volumes V(k) for each keyword using the bid-volume elasticity curves for those keywords. The bids computed by this method achieve the lowest total purchased traffic cost that delivers the volume requested.

Figure 7A:
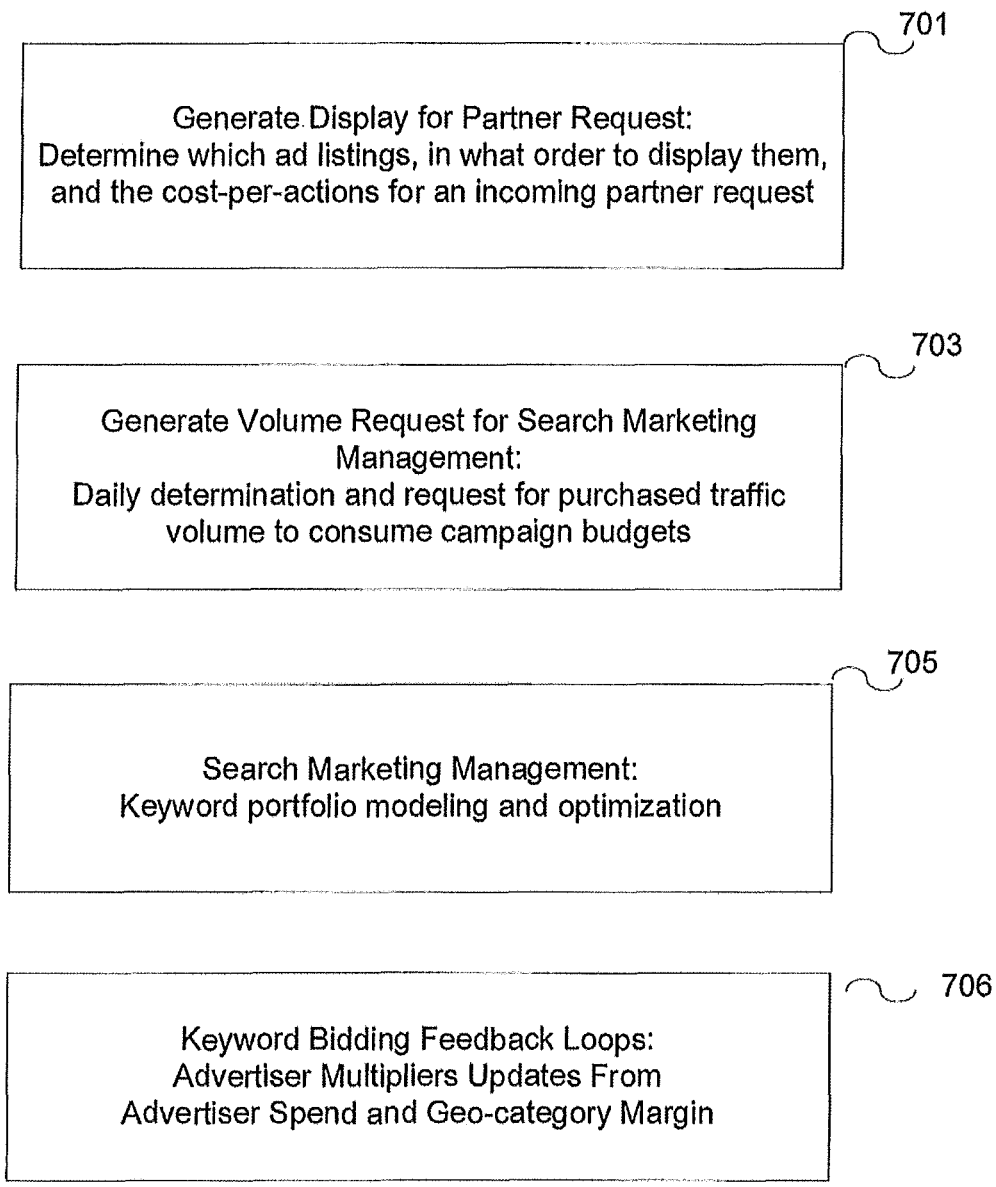
FIG. 7(a)-(b)-(c)-(d)-(e)-(f)-(g) are the optimization module in accordance with one embodiment of the present invention.

The optimization module is also responsible for computing the traffic volume request that is input to the Search Marketing Management component 705 referenced in FIG. 7(a). In 703, a traffic volume request is computed for each business campaign to supplement any short fall in leads and budget consumption delivered by the sum-total of all other sources. The volume request is computed at set time intervals. The computation uses as input the total budget and the available budget of a campaign, the conversion to leads on the business profile or website from purchased clicks redirecting to the business profile or website, the remaining campaign duration, the historically delivered volume for a given volume request, the historical pause request times for a given volume request, and the target pause time defined as the time of day at which a business' campaign should have received its daily lead traffic. Note that the latter depends on the business' hours of operation.

Figure 7B:
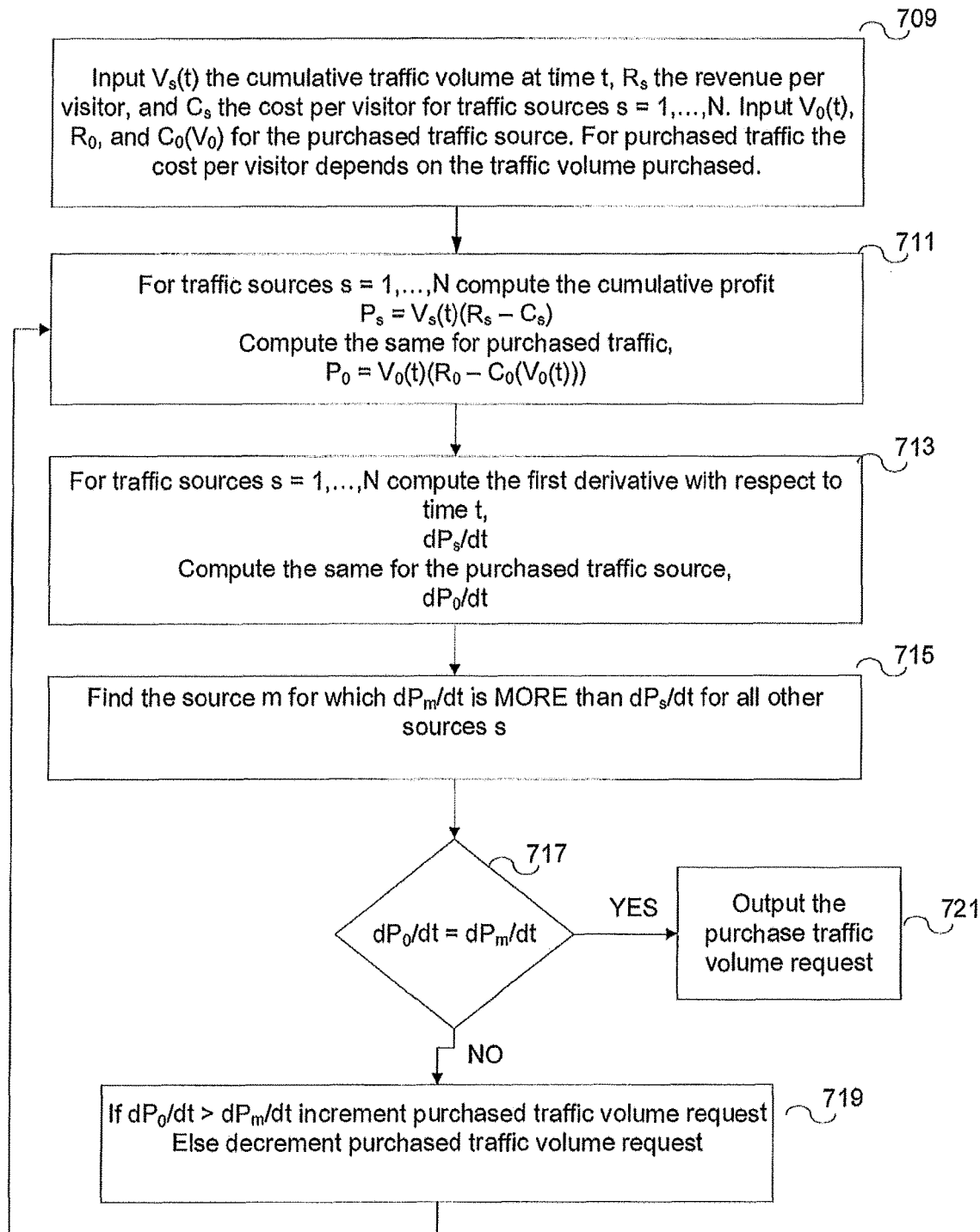

Referring to FIG. 7(b), for the details of the purchased traffic volume request in 703, 709 takes as inputs the cumulative traffic volume, revenue per visitor and cost per visitor for each traffic source. These inputs are used to compute the cumulative profit for each traffic source in 711 and to compute the marginal profit for each traffic source in 713. The non-purchased traffic source with the highest marginal profit is selected in 715 and if that marginal profit equals the purchased traffic marginal profit in 717 then 721 outputs the current purchased traffic volume request. If the marginal profit is not equal to the purchased traffic marginal profit, then in 719 if it is greater, the purchased traffic volume is incremented and if it is less the volume is decremented. Control is returned to 711 and the process repeats until the termination condition is met in 717.

As indicated herein, one implementation of the technology can include a component that manages the bidding process for one or more advertisers where the advertisers place bids with a search engine provider for key words such that when a user of the search engine enters a search query matching the key word, the bid provided by the advertiser will impact the placement of the advertiser's ad information in the list of results provided in the search result. In general, the method allows for different matching criteria between the key word and the search query (e.g. exact, phrase, broad or modified broad match-type). An advertiser can bid for a given key word and any number of key words that an advertiser believes is relevant to his business. The method may enter different bids for different words. There are usually multiple advertisers that have bid on the same key word and there are usually multiple keywords on which a given advertiser bids. The advertiser desires to have significant placement in the list of search results, usually near or at the top of the list is desirable. This is a function of how many leads the system is trying to get for the advertiser. The method doesn't try to place advertisers near the top as a goal; instead it tries to get them enough calls (leads), which may mean that it has to place them near the top. When a user enters a search query containing a key word or a related key word, the search engine provider determines among all bidders what advertiser content is going to get shown and in what order. The advertiser or the consulting firm managing bids for one or more advertisers has to now figure out how much to bid to get on the desired level of placement so that each item gets enough clicks on their content. An higher placement usually results in more clicks.

Currently there are several rule based systems for addressing bidding, where there are bidding rules that call for bidding higher if a particular event occurs or bidding lower if a particular event occurs. In the case of a consulting firm managing multiple advertisers, they often look at the aggregate level where each advertiser that they are managing has a bucket of keywords that the advertiser is interested in, for example a plumber has "plumbing", "water heaters", "sewage drains" and like keywords. Often like advertisers are all interested in some of the same keywords and the consulting firm must figure out how to most effectively manage an advertisers bid budget in order to drive traffic or clicks most cost effectively. Some consulting companies have the ability to bid by optimizing a key word portfolio where basically each advertiser has a key word portfolio and a global goal that defines the number of clicks for that portfolio per day and from which key word these clicks come from. The objective is to most cost effectively get the cheapest cost per click to obtain the desired number of clicks per day. Alternatively the objective may be to maximize the number of clicks or calls at a desired budget amount. Consultants use computer programs to calculate the bid for each keyword to minimize the total costs, while obtaining the desired number of clicks. However, for these types of systems, calculations are at the advertisers' level, therefore, when managing hundreds of advertisers it's not ideal to let the algorithms come up with independent solutions for each advertiser because the end result is the advertisers that the consultant firm is managing are essentially bidding one against the other, therefore, basically you're bidding against yourself. Therefore, these types of systems have experienced problems because there can be too many variables to effectively manage.

One implementation of the present technology divides, or stated another way, splits the problem into two parts and each part basically operates independently of the other and aggregates over the ignored aspect of the other part. The problem involves a set of advertisers being collectively managed that bid for the same keywords and instead of solving the bidding problem as one problem, it is divided into two smaller problems. One part of the operation ignores the multiple advertiser aspect part of the problem and their related objectives and budgets. The method takes the original problem and then aggregates all of the information and data related to keywords across all advertisers so that the method only initially looks at a single keyword portfolio problem. Instead of having bids for each keyword for each advertiser, the method only develops bids for each keyword as if they were for a single advertiser.

Figure 7C:
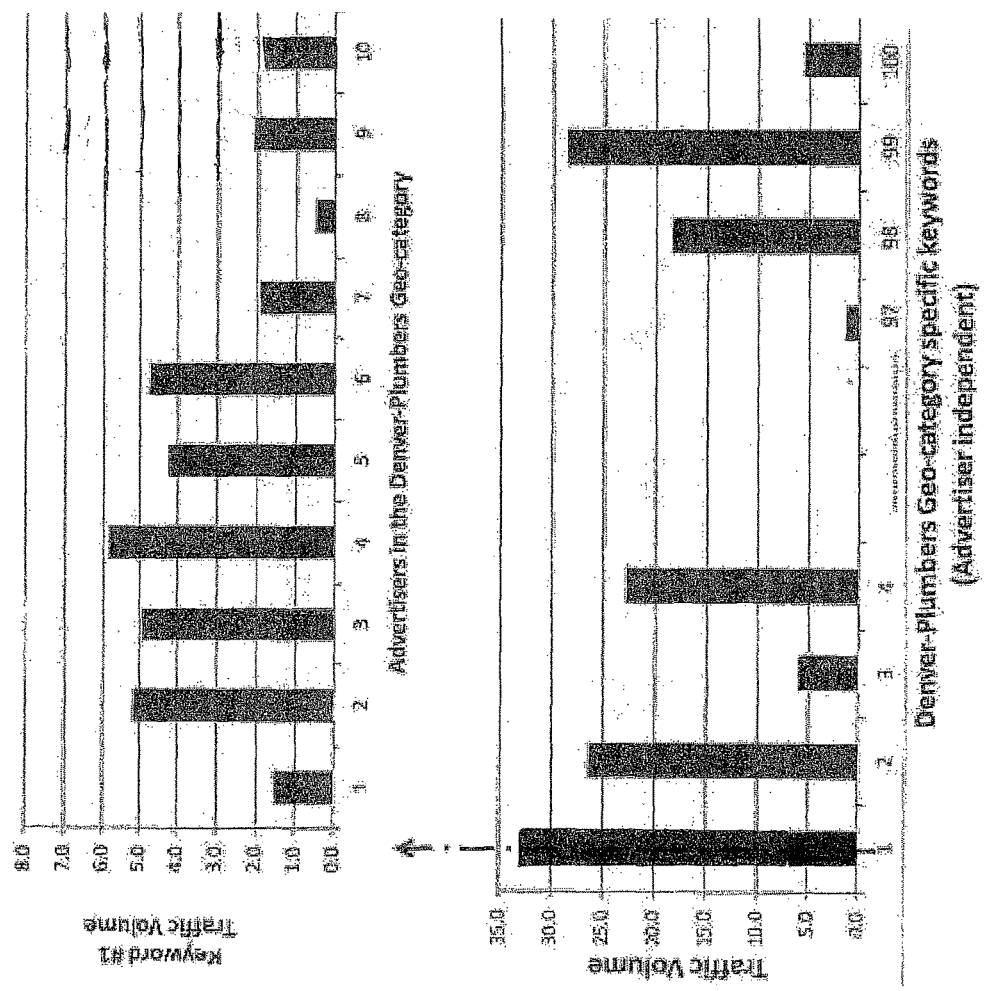

For example out of 10 plumbers advertising in the Denver-Plumbers geo-category, the method is only now solving a single 100 keyword problem once and then uses the same solution for all advertisers. As shown in FIG. 7(c), the 100 keywords are determined from a peer group of advertisers. Therefore, for advertisers that are of the same peer group, a set of key words can be developed that is an aggregate for all advertisers in the peer group. For example, based on historical data, the union of all the keyword for plumbers in the peer group can be taken. This is an approximation for the first portion of the method and then for the second part, the method only adjusts the bid for each advertiser individually instead of also looking at a keyword problem. This portion of the method only looks at the advertiser level of the problem and now, for example, it is only the 10 advertisers that are optimized and not the 100 keywords. The number of key words and advertisers may vary without departing from the scope of the invention. The problem is essentially split along dimensions: the dimension of the keyword portfolio and the dimensions of each individual advertiser. These dimensions define orthogonal complementary subspaces that make up the space of the non-competing-advertisers keyword-bidding problem. There is also a component in the bidding system, that steers modeled margins towards a target margin. It is also an iterative script and is run periodically. A margin adjustment process is often needed for the current implementation that steers margins. For example, the method can retrieve keyword portfolio margins for a given geo category from the day before and update bid multipliers directionally according to the difference between the target margin and the calculated margin. All multipliers for advertisers in a geo category can be adjusted by the same amount, so that relative ordering of advertisers obtained from the multipliers is maintained. The latter component works in the subspace defined by the advertiser dimensions.

Figure 7D:
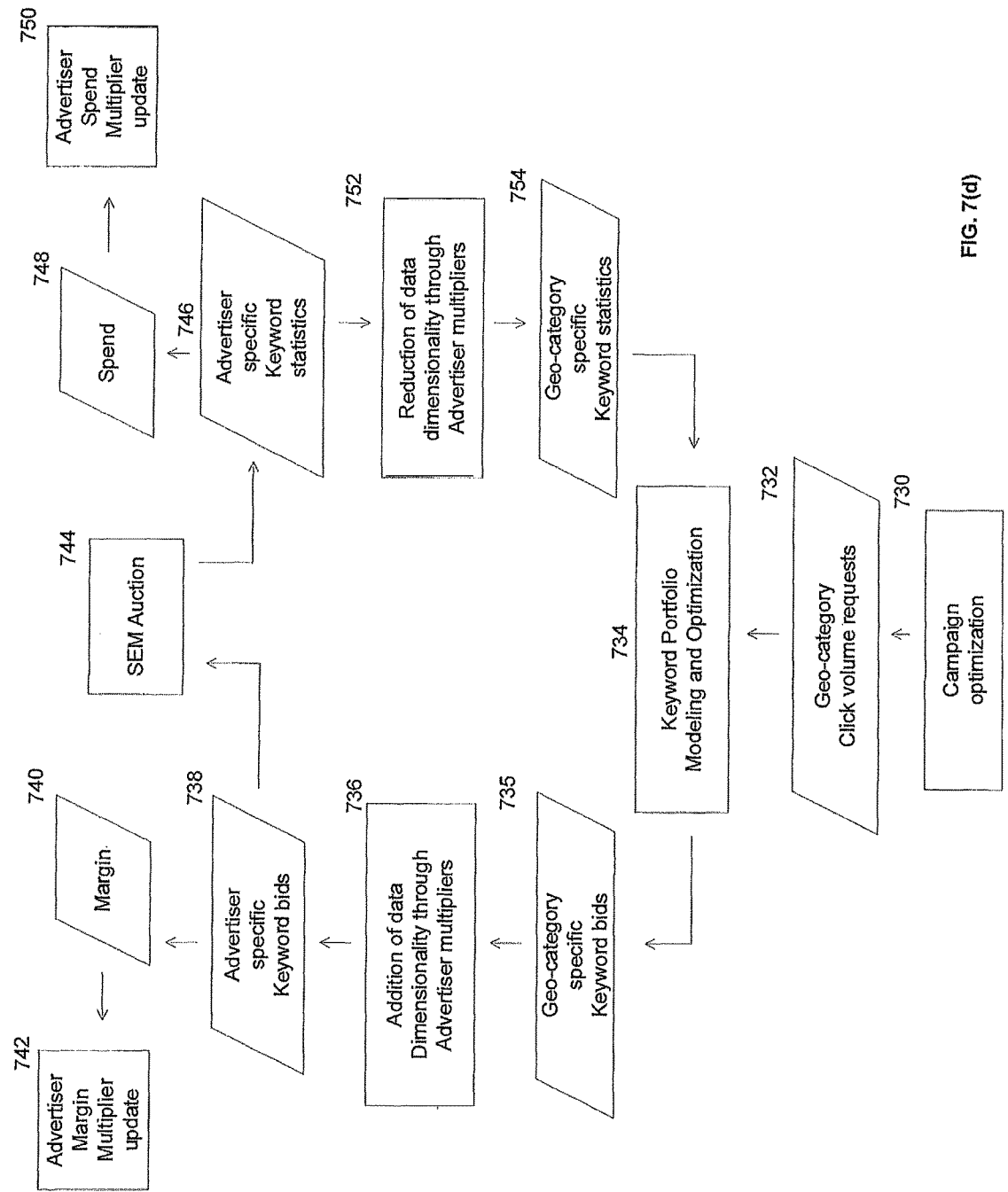

As shown in FIG. 7(d), the method splits the non-competing-advertisers keyword-bidding problem in two components: a) the Geo-category specific keyword portfolio modeling and optimization (734) and b) the advertiser multipliers margin (742) and spend (750) update processes. Geo-category specific key words are intended as key words targeted to match search queries generated from a uniquely defined combination of a geographic area and an advertising category, e.g. the Geo-category Denver-Plumbers, defining queries generated for plumbers from the Denver area. The first component determines a bid for each Geo-category specific keyword, so that every advertiser will initially get that same bid for each keyword. The second component acts as a modulator that looks at each of the 10 advertisers in the example and determines a relative ordering or a factor (or stated another way—scale or multiplier) for each advertiser. Then the method multiplies the Geo-category specific bids by the factor to determine a given advertisers bid. Each advertiser will have its own multiplier that will apply to all of that advertiser's base bids. One of the criteria for the keyword portfolio optimization can be to minimize the costs given a total number of clicks that are desired. For example, if you have 2 keywords in the keywords portfolio, the method can determine the bids for those 2 keywords so that the desired number of clicks is achieved, which for example is 10 clicks per day. The method determines how much to bid on each keyword to get to 10 clicks at the cheapest cost. This can be determined based on statistical information that has been gathered. The method uses historical statistical information to infer whether a particular keyword can generate more or less clicks compared to its keyword peers. This type of statistical information is well known to those skilled in the art and is often made available by a search engine provider.

The second component of the bidding system provides a solution for a complex problem by using modulation to normalize the advertisers for performance and for budget. Every advertiser may have different needs, for example, they may want to spend different amounts of money, for example, if an advertiser is spending $10,000 or $1,000 a month versus one who is only spending $100 a month, then the clicks need to be more or less proportional to their budget. So the modulator will have to basically order these effectively so that they fall into the right listing positions and that's the purpose of the modulation for the budget. Also taken into account is that different advertisers get different quality scores by the search engine provider and that directly impacts how the advertiser will show in the list. So all things being equal if one submits a $5 bid, for both advertisers and the search engine provider considers them to be performing equally, then effectively they show at more or less the same position and will randomize their ranking.

However, the search engine provider, typically, does not treat any two advertisers equally in that the search engine provider considers the performance of each advertiser and rates them according to their performance. The provider measures performance based on examining historical click-through data, that is to determine if the ad has been less or more appealing to a consumer historically, then the provider makes the determination whether the users are less likely to click on the ad and the provider will penalize or reward the advertiser utilizing a factor that is called a quality score. Unless the quality score is the same for each advertiser, the method accounts for the difference in quality score and make adjustments to make sure that the advertiser shows in the appropriate position that it needs to show to be able to spend, and to get enough traffic for the budget. There are two normalizing cases, one for an advertiser that has to normalize for performance and the advertiser that has to normalize for needed traffic, which depends on each of the budgets. The effect of that is that the method will have to bid more for that advertiser with lesser performance to appear in the same places, in the same listing.

The method adjusts the multiplier for all of the advertisers so that their relevant ordering is correctly maintained and that can be achieved through determining that multiplier for each, which can be a different number for each of the advertisers that can be multiplied into their respective base bid. Bids are generated from the optimization engine and then the method examines the data that comes back in terms of traffic the next day to determine how many clicks the bids generated for each advertiser and then the method calculates and captures the price for each of these clicks and examines performance. For example if a given advertiser needs $100 spent, stated another way—has a $100 spend budget, and received a desired ten clicks, each click was priced at $5, therefore, he spent $50 out of $100 budgeted, so he still needs to spend more in order to expend the budget, therefore, the method will increase the multiplier so that the next time he will get more traffic resulting from a higher bid. The method can increase that bid until it stabilizes to having it matching the $100 per day need on average and then once that need is met, then the modulating factor remains at that level, and that can happen independently for each advertiser.

The method can adjust the bids up or down until the method achieves a level of traffic that meets the goal. Now that in itself will result in a bid that will achieve the needs but possibly not optimal because at this point the method would be bidding against itself when it is looking at these bids independently. However, the goal here is only to establish the proper relative ratios of these bids.

For example, advertiser A has a multiplier of one (1), advertiser B has a multiplier of three (3) and advertiser C has a multiplier of five (5), resulting in ratios that are 1 to 3 to 5 that reorder advertisers in the desired manner. Therefore, when the method applies these modulators, the right ordering of the advertisers in terms of their placement will achieve the right ratio, or that each will achieve the right amount of traffic, and will be stabilized and the method can have those 3 factors 1, 3 and 5 that can be multiplied into their respective bids such that each advertiser gets exactly the amount of traffic needed per day, while the keyword optimization can change the bids such that if the method changes the bids on one keyword and moves, and reduces the bid on another keyword, therefore, the ordering is still intact if the method makes a linear approximation. For example, the method decreases a base bid across the board for all advertisers, on a given keyword. The method can reduce all bids by half on that keyword, so instead of five bucks you only bid two and a half bucks for one advertiser and instead of ten bucks the method only bids five bucks. The key observation is that now the advertisers still get the same relative fraction of traffic. So instead of 100% from a given keyword, now advertiser A gets only, say, 50% of its traffic from that keyword, but the same is going to be true for the other advertisers, so instead of 100% of the old traffic amount, they also now only get 50% of that, i.e., the percentage is going to be approximately the same for each advertiser. Therefore, the method as always maintains, to a degree, the desired placement through those modulators so in other words, the keyword optimization can keep doing what it has been doing, ignoring how much each advertiser needs individually because they have been adjusted through the modulating factors.

Therefore, the two parts work together to attack different aspects of the problem, one part is concerned with getting a relative ordering of the advertisers and then the other part is concerned with getting the right base bids at the keyword level to get the right portfolio of keywords, basically it knows how much weight each keyword should have in the portfolio, but it doesn't know how the traffic for that keyword is being distributed across to the advertisers.

Figure 7E:
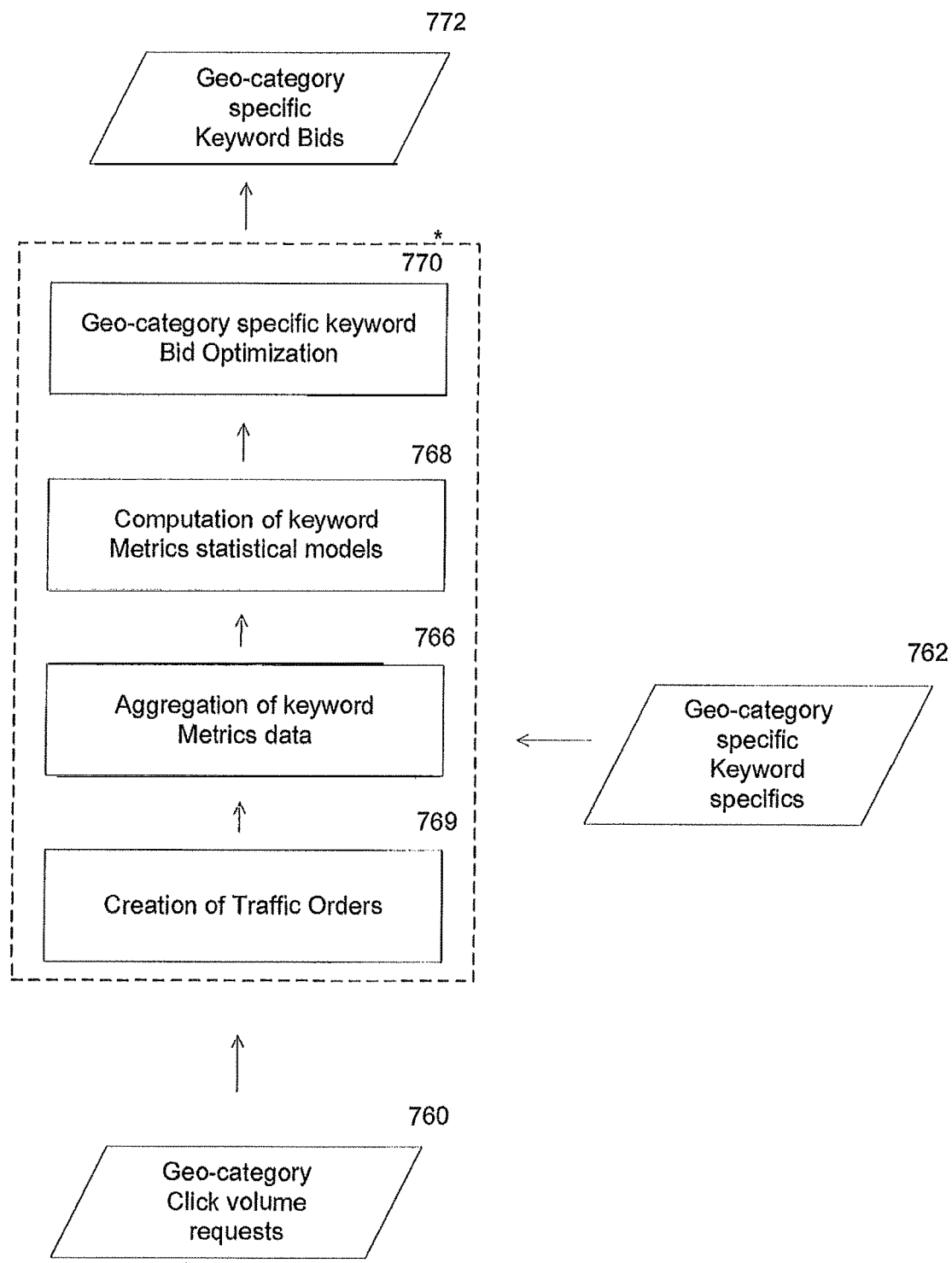

Referring to FIG. 7(e), the purpose of the keyword Portfolio Modeling and Optimization module is to a) load geo-category specific keyword statistics (762) and Geocat click-volume requests (760), b) create traffic orders, defined by click volume request, ceiling for bid amounts and relation between geo-categories metrics and their purchasable targets (keywords, ads) as in 764, c) aggregate keyword performance metrics data, such as daily listing impressions, bid amount and Click Through Rate CTR, for all geo-category specific keywords as in 766, d) run mathematical algorithms to model the aggregated keyword performance metrics as in 768 and e) use these models to perform an optimization algorithm which generates search bid values with the purpose of fulfilling the total click-volume request at a minimum overall cost as in 770.

FIG. 7(d) shows the relations between the Keyword Portfolio Modeling and Optimization component (734) and the advertisers' multipliers margin (742) and spend (750) updates. The campaign optimization (730) generates Geo-category specific volume requests (732) that are fed to the Keyword Portfolio Modeling and Optimization component along with the Geo-category specific Keyword statistics (754). Geo-category specific Keyword bids (735) are generated by (734) and the advertisers dimensions are added multiplying the Geo-category specific Keyword bids (735) by the Advertisers' Multipliers so to obtain Advertiser specific Keyword bids (738). The modeled margin can be calculated (740) and used to update the Advertisers' multipliers through the Advertiser Margin Multipliers Update (742). The newly calculated Advertiser specific Keyword Bids are then committed to the online SEM Auction. As a result of the auction (or multiple auctions), the Search Engine provides statistics related to the keyword auctioned (746). These statistics will be used to calculate each Advertiser Spend (746) which will be fed to the Advertiser Spend Multipliers Update (750). Cost-related data (bid, cpc) included in the statistics will be then divided by each respective Advertiser multiplier, so to remove the dimensions related to the Advertisers subspaces. The resulting Geo-category specific Keyword statistics will be fed back into the Keyword Portfolio Modeling and Optimization component.

Figure 7F:
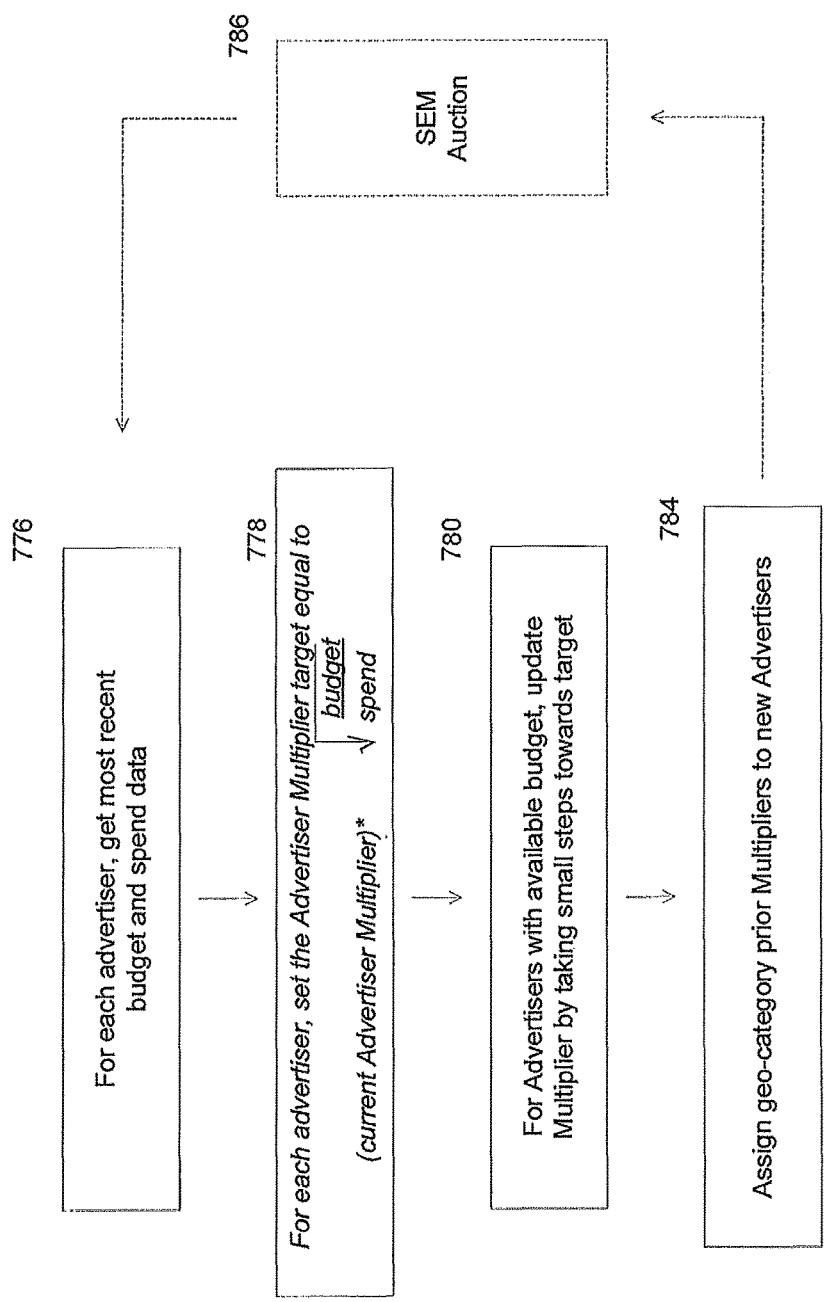

The Advertiser Spend Multipliers Update component is described in FIG. 7(f). The most recent budget and spend data for each advertiser are retrieved (776), then the Advertiser Multiplier Target (780) is calculated as $$\text{Advertiser Multiplier Target} = (\text{current Advertiser Multiplier}) \times \sqrt{\frac{\text{budget}}{\text{spend}}}$$

For advertisers with available budget to spend, the Advertiser Multiplier Spend update process takes small steps towards the target. Geo-category prior values are assigned to multipliers of newly joined Advertisers (784). The updated Multipliers will be then fed to the Advertiser Margin Multipliers Update process.

Figure 7G:
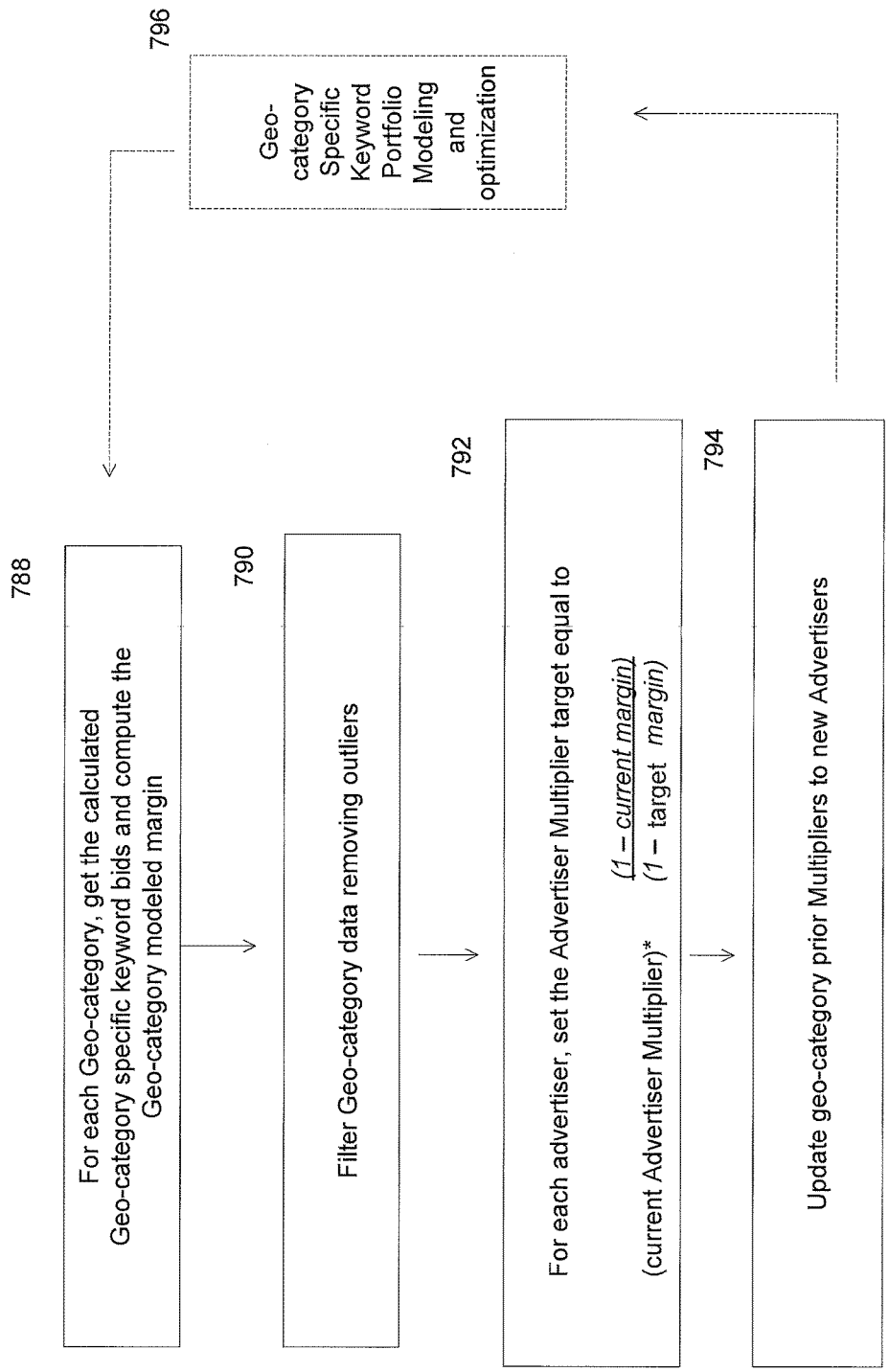

The Advertiser Margin Multipliers Update component is described in FIG. 7(g). For each Geo-category, the newly calculated Geo-category specific keyword bids are retrieved and the Geo-category modeled margin is computed (788) as $$\sum_{i=1}^{n} \text{price}_i - (\text{modeled click cost})_i$$

where n is equal to the number of keywords in the Geo-category. Outliers are then removed from Geo-category data (790) and for each Advertiser. The most recent monthly budget and spend data for each advertiser are retrieved (776), then the Advertiser Multiplier Target (794) is calculated as $$\text{Advertiser Multiplier Target} = \\ (\text{current Advertiser Multiplier}) \times \frac{(1 - \text{current margin})}{(1 - \text{target margin})}$$

The Advertiser Multiplier Margin update process takes small steps towards the target. The updated multipliers will be used to a) calculate Advertiser specific Keyword bids from Geo-category specific bids calculated by the Keyword Portfolio Modeling and Optimization module (736, FIG. 7(*d*)), to be finally committed to the SEM Auction and to b) calculate Geo-category specific Keyword statistics from Advertiser specific Keyword Statistics obtained by the Search Engine, following the SEM auction (or auctions) as shown in 736, FIG. 7(*d*).

Figure 8A:
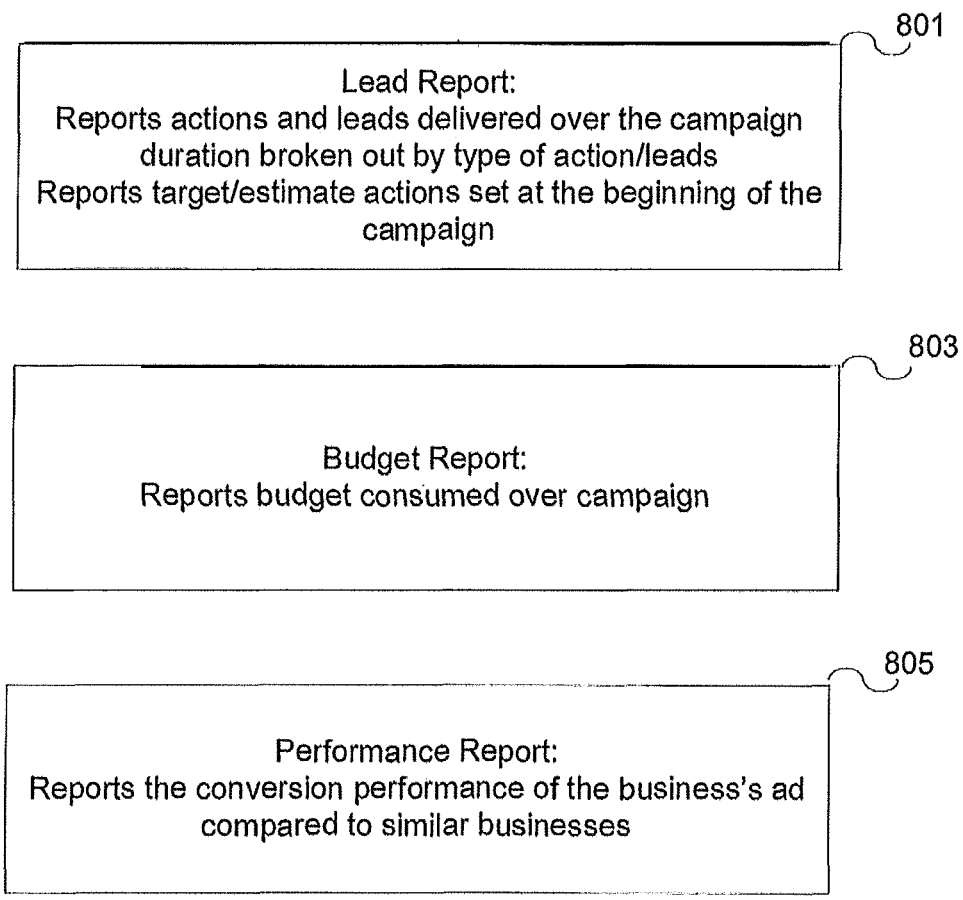
FIG. 8(a)-(c) are the reporting module in accordance with one embodiment of the present invention.
Figure 8B:
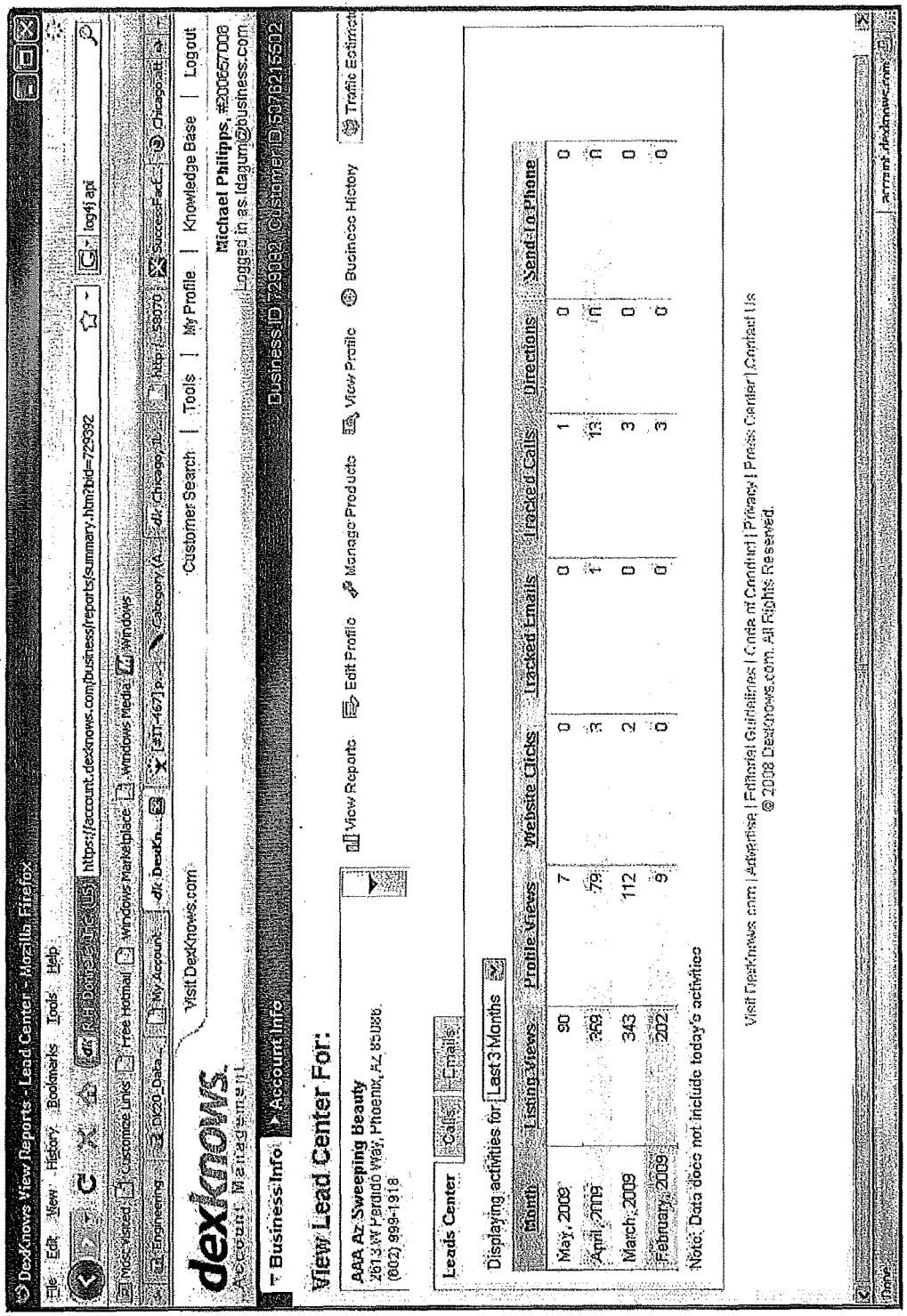
Figure 8C:
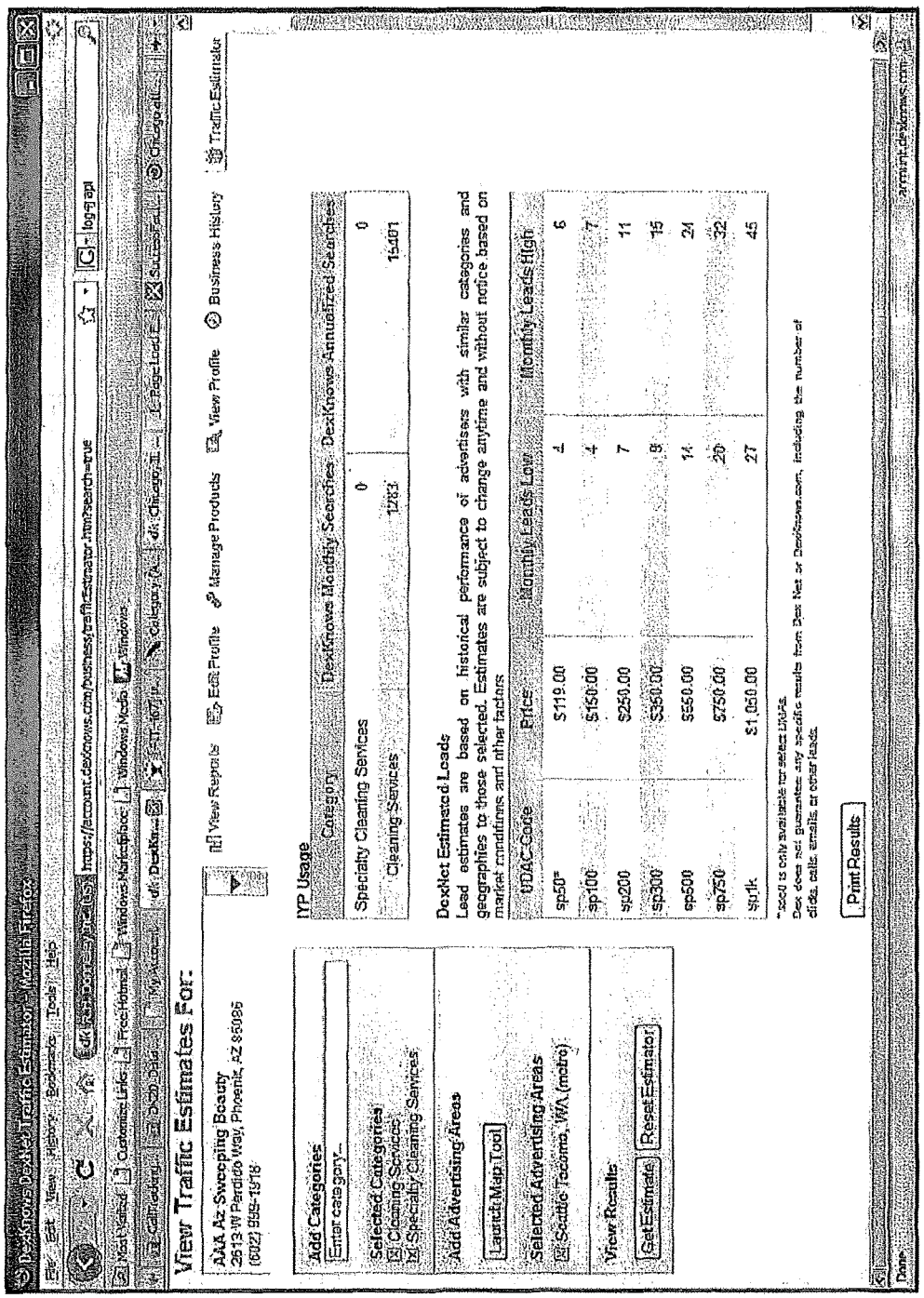

FIG. 8(*a*) illustrates an embodiment of the reporting module configured in accordance with the present invention and is not intended to limit scope as one of ordinary skill would understand on review of this application that other configurations could be utilized without departing from the scope of the claimed invention. In reference to FIG. 8(*a*), the reporting module comprises the lead report 801, the budget report 803, and the performance report 805. The reports can be updated daily. The lead report contains the running total of all actions and leads delivered by campaign and aggregated by action type and lead type. The report also contains the lead estimates delivered during campaign creation. The budget report contains a daily snap-shot of the budget consumed and the remaining available budget. The performance report compares the ad listings and business profile's conversion rate to leads and actions to the average conversion rates for each geo-category-attribute target. The business user can use this report to gain insight on whether her products and services are relevant to those targets and to optimize her campaign creatives and targeting.

FIG. 8(*b*)-(*c*) illustrate example lead reports configured in accordance with the present invention and is not intended to limit scope as one of ordinary skill would understand on review of this application that other configurations could be utilized without departing from the scope of the claimed invention. In reference to FIG. 8(*b*), the example lead report 807 for business AAA Az Sweeping Beauty contains the number monthly ad listing views, business profile views, clicks to website, tracked calls, tracked emails, direction views, and send-to-phone. The lead estimates provided to AAA Az Sweeping Beauty during campaign creation are shown in 809. Monthly leads low and monthly leads high estimates are provided at varying budgets.

Figure 9A:
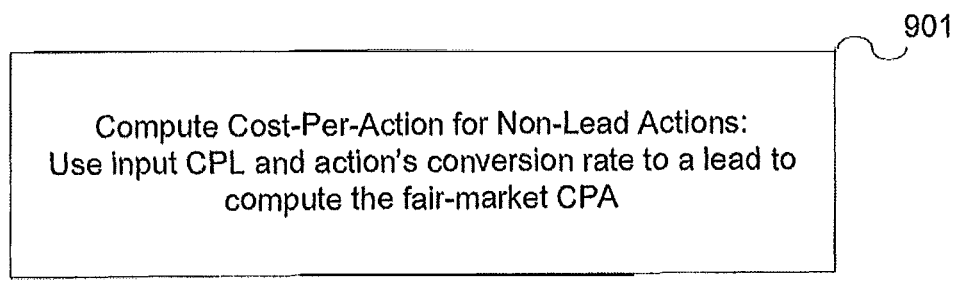
FIG. 9(a)-(b) are the pricing module in accordance with one embodiment of the present invention.
Figure 9B:
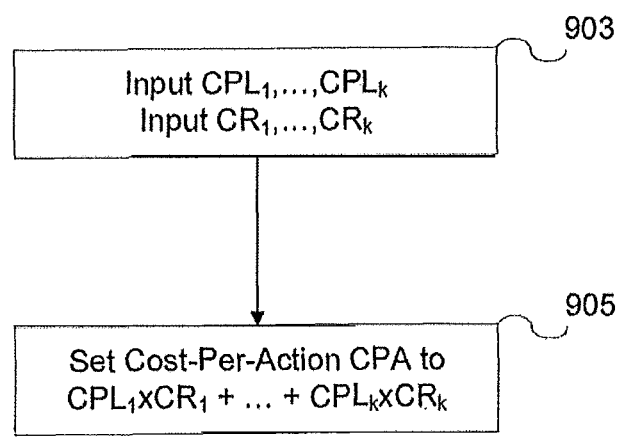

FIG. 9(*a*)-(*b*) illustrate an embodiment of the pricing module configured in accordance with the present invention and is not intended to limit scope as one of ordinary skill would understand on review of this application that other configurations could be utilized without departing from the scope of the claimed invention. The pricing module 901 computes the prices of leads and actions used to decrement budgets. Lead prices are the cost-per-leads (CPLs) which are inputs to the present invention. When a lead is generated directly from an ad listing displayed on a partner site or a search marketing site, the appropriate CPL price that corresponds to that lead type may be used to decrement the business user's budget. When a click to a business profile or website is generated from the ad listing, the price for that click is computed by the pricing module and the budget decremented accordingly. Referring to FIG. 9(*b*), for a click action the price computation in 903 takes as input the CPLs of all lead actions available to the user after she clicks, and the average lead conversion rates CRs specific to the traffic source and target for each of the available lead actions. In 905 the cost-per-action price is computed by first multiplying the CPLs by their corresponding conversion rates CRs and then summing these values. Note that the CPA for an action depends on the traffic source. For example, consider a user who clicks on the click-to-profile link of an ad listing displayed on traffic source S. Assume the profile has a call number and an email link with a CostPerCall value of $20 and a CostPerEmail value of $10 for that geo-vertical. The user lands on the business profile and can generate a lead to the business owner by making a call or sending an email. The conversion rate for each of these events will depend on the traffic source S. If for S the average call-through-rate is 0.1 and the average email-through-rate is 0.05, the Cost-PerAction (click-to-profile in this case) is $20×0.1+$10× 0.05 $2. 50.

The various implementations and examples shown above illustrate a method and system for managing an internet based advertisement campaign. The various embodiments of the system and method for enabling a business owner to receive leads and examples thereof shown above illustrate a novel system and method for managing an internet based advertisement campaign. A user of the present method and system may choose any of the above implementations, or an equivalent thereof, depending upon the desired application. In this regard, it is recognized that various forms of the subject campaign management method and system could be utilized without departing from the spirit and scope of the present invention.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a smart phone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A computer implemented method for managing a keyword bidding process, said method comprising the steps of:
    loading, by a computer having a processor and a memory, geo-category specific keywords in a keyword portfolio and computing elasticity curves of cost as a function of click volume for each geo-category specific keyword based on an aggregate of historical key word cost and click volume-data, where the geo-category specific key words are key words targeted to match search queries generated from a uniquely defined combination of a geographic area and an advertising category;
    determining by the computer a base bid for each geo-category specific keyword which achieves a desired number of clicks at minimal cost, thereby determining an advertiser independent base bid for each geo-category specific keyword of the keyword portfolio, by utilizing an optimization method that computes a slope of each of the keyword elasticity curves of cost as a function of click volume, and computes each keyword click volume, at which all keyword elasticity curves' slopes are equal and such that a total sum of each keyword click volume equals a click volume requested to the keyword portfolio;
    determining by the computer an advertiser spend multiplier target for each of a plurality of advertisers whereby the advertiser spend multiplier target=(current advertiser multiplier)×(budget/spend)^(½);
    determining by the computer an advertiser margin multiplier target for each of the plurality of advertisers whereby the advertiser margin multiplier target=(current advertiser multiplier)×[(1-current margin)/(1-target margin)];
    determining by the computer updated values of an updated advertiser multiplier, initially set to a geo-category dependent prior value, through a directional update process of the updated advertiser multiplier, by changing the geo-category dependent prior value by taking an incremental step towards the advertiser spend multiplier target and then changing by taking another incremental step towards the advertiser margin multiplier target; and
    determining, by the computer for each geo-category specific keyword, an individual advertiser specific bid by multiplying the advertiser independent base bid by the updated advertiser multiplier.

2. The computer implemented method as recited in claim 1, further comprising the step of:
    adjusting, by the computer, each individual advertiser bid proportionally based on performance data.

3. The computer implemented method as recited in claim 2, where, adjusting each individual advertiser bid proportionally includes establishing a relative order amongst the plurality of advertisers and a relative ratio of advertiser bids.

4. The computer implemented method as recited in claim 3, where determining the individual advertiser multiplier includes identifying an initial individual advertiser multiplier and modifying the initial individual advertiser multiplier to determine the individual advertiser multiplier based on a quality score determined by a search engine provider.

5. The computer implemented method as recited in claim 3, where, adjusting each individual advertiser bid proportionally includes adjusting all multipliers for advertisers in a geo category by the same factor so that the relative ordering of the plurality of advertisers obtained from the multipliers is maintained.

6. The computer implemented method as recited in claim 5, where the keyword portfolio is geo category specific and further comprising the step of:
    retrieving, by the computer, keyword portfolio margins for a given geo category and updating the multipliers directionally according to a difference between a target margin and a calculated margin.

7. A computer system for managing a keyword bidding process comprising: a computer having a memory and one or more processors; and
    one or more programs, stored in the memory and executed by the one or more processors, where the one or more programs include, instructions for loading, by a computer, geo-category specific keywords into a keyword portfolio and computing elasticity curves of cost as a function of click volume for each geo-category specific keyword based on an aggregate of historical key word cost and click volume data, where the geo-category specific key words are key words targeted to match search queries generated from a uniquely defined combination of a geographic area and an advertising category, instructions for determining, by the computer, a base bid for each geo-category specific keyword which achieves a desired number of clicks at minimal cost, thereby determining an advertiser independent base bid for each geo-category specific keyword of the keyword portfolio, by utilizing an optimization method that computes a slope of each of the keyword elasticity curves of cost as a function of click volume, and computes each keyword click volume, at which all keyword elasticity curves' slopes are equal and such that a total sum of each keyword click volume equals a click volume requested to the keyword portfolio, instructions for determining, by the computer, an advertiser spend multiplier target for each of a plurality of advertisers whereby the advertiser spend multiplier target=(current advertiser multiplier)×(budget/spend)^(½), instructions for determining, by the computer, an advertiser margin multiplier target for each of the plurality of advertisers whereby the advertiser margin multiplier target =(current advertiser multiplier)×[(1-current margin)/(1-target margin)], instructions for determining, by the computer, updated values of an updated advertiser multiplier, initially set to a geo-category dependent prior value, through a directional update process of the updated advertiser multiplier, by changing the geo-category dependent prior value by taking an incremental step towards the advertiser spend multiplier target and then changing by taking another incremental step towards the advertiser margin multiplier target, and instructions for determining, by the computer, for each geo-category specific keyword, an individual advertiser specific bid by multiplying the advertiser independent base bid by the updated advertiser multiplier.

8. The computer system as recited in claim 7, where the one or more programs further include, instructions for adjusting, by the computer, each individual advertiser bid proportionally based on performance data.

9. The computer system as recited in claim 8, where instructions for adjusting each individual advertiser bid proportionally includes instructions for establishing a relative order amongst the plurality of advertisers and a relative ratio of advertiser bids.

10. The computer system as recited in claim 9, where instructions for determining the individual advertiser multiplier includes instructions for identifying an initial individual advertiser multiplier and modifying the initial individual advertiser multiplier to determine the individual advertiser multiplier based on a quality score determined by a search engine provider.

11. The computer system as recited in claim 9, where instructions for adjusting each individual advertiser bid proportionally includes instructions for adjusting all multipliers for advertisers in a geo category by the same factor so that the relative ordering of the plurality of advertisers obtained from the multipliers is maintained.

12. The computer system as recited in claim 9, where the keyword portfolio is geo category specific and further including instructions for retrieving, by the computer, keyword portfolio margins for a given geo category and updating the multipliers directionally according to a difference between a target margin and a calculated margin.

13. A non-transitory computer readable storage medium for use in conjunction with a computer system, the computer readable storage medium storing one or more programs including instructions for execution by the computer system, the one or more programs when executed by the computer system cause the computer system to perform operations comprising:

loading, by a computer having a processor and a memory, geo-category specific keywords in a keyword portfolio and computing elasticity curves of cost as a function of click volume for each geo-category specific keyword based on an aggregate of historical key word cost and click volume-data, where the geo-category specific key words are key words targeted to match search queries generated from a uniquely defined combination of a geoeraphic area and an advertising category;

determining, by the computer, a base bid for each geo-category specific keyword which achieves a desired number of clicks at minimal cost, thereby determining an advertiser independent base bid for each geo-category specific keyword of the keyword portfolio, by utilizing an optimization method that computes a slope of each of the keyword elasticity curves of cost as a function of click volume, and computes each keyword click volume, at which all keyword elasticity curves' slopes are equal and such that a total sum of each keyword click volume equals a click volume requested to the keyword portfolio;

determining, by the computer, an advertiser spend multiplier target for each of a plurality of advertisers whereby the advertiser spend multiplier target=(current advertiser multiplier)×(budget/spend)^(½);

determining, by the computer, an advertiser margin multiplier target for each of the plurality of advertisers whereby the advertiser margin multiplier target=(current advertiser multiplier)×[(1-current margin)/(1-target margin)];

determining, by the computer, updated values of an updated advertiser multiplier, initially set to a geo-category dependent prior value, through a directional update process of the updated advertiser multiplier, by changing the geo-category dependent prior value by taking an incremental step towards the advertiser spend multiplier target and then changing by taking another incremental step towards the advertiser margin multiplier target; and determining, by the computer, for each geo-category specific keyword, an individual advertiser specific bid by multiplying the advertiser independent base bid by the updated advertiser multiplier.

14. The non-transitory computer readable storage medium as recited in claim 13, further comprising:

adjusting, by the computer, each individual advertiser bid proportionally based on performance data.

15. The, non-transitory computer readable storage medium as recited in claim 13, where adjusting each individual advertiser hid proportionally includes establishing a relative order amongst the plurality of advertisers and a relative ratio of advertiser bids.

16. The, non-transitory computer readable storage medium as recited in claim 13, where determining the individual advertiser multiplier includes identifying an initial individual advertiser multiplier and modifying the initial individual advertiser multiplier to determine the individual advertiser multiplier based on a quality score determined by a search engine provider.

17. The non-transitory computer readable storage medium as recited in claim 13, where
adjusting each individual advertiser bid proportionally includes adjusting all multipliers for advertisers in a geo category by the same factor so that the relative ordering of the plurality of advertisers obtained from the multipliers is maintained.

18. The non-transitory computer readable storage medium as recited in claim 13, where the keyword portfolio is aeo category specific and further comprising:
retrieving, by the computer, keyword portfolio margins for a given geo category and updating the multipliers directionally according to a difference between a target margin and a calculated margin.

* * * * *